US012585931B2

(12) United States Patent
Lung

(10) Patent No.: US 12,585,931 B2
(45) Date of Patent: Mar. 24, 2026

(54) 3D HYBRID BONDING 3D MEMORY DEVICES WITH NPU/CPU FOR AI INFERENCE APPLICATION

(71) Applicant: MACRONIX INTERNATIONAL CO., LTD., Hsinchu (TW)

(72) Inventor: Hsiang-Lan Lung, Ardsley, NY (US)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 571 days.

(21) Appl. No.: 18/143,502

(22) Filed: May 4, 2023

(65) Prior Publication Data

US 2024/0370715 A1 Nov. 7, 2024

(51) Int. Cl.
*G06N 3/063* (2023.01)
*G06N 3/048* (2023.01)

(52) U.S. Cl.
CPC ............. *G06N 3/063* (2013.01); *G06N 3/048* (2023.01)

(58) Field of Classification Search
CPC ........ G06N 3/063; G06N 3/048; G06N 3/045; G06N 3/065; G06N 5/04; H10B 80/00
See application file for complete search history.

(56) References Cited

U.S. PATENT DOCUMENTS

| | | | | |
|---|---|---|---|---|
| 4,219,829 A | * | 8/1980 | Dorda | H10D 62/314 |
| | | | | 257/E29.05 |
| 4,987,090 A | * | 1/1991 | Hsu | H10B 10/12 |
| | | | | 257/E21.537 |
| 5,029,130 A | * | 7/1991 | Yeh | H10D 64/035 |
| | | | | 365/186 |
| 5,586,073 A | * | 12/1996 | Hiura | H10D 30/685 |
| | | | | 365/185.24 |

(Continued)

FOREIGN PATENT DOCUMENTS

| | | |
|---|---|---|
| CN | 101432821 A | 5/2009 |
| CN | 1998012 B | 11/2010 |

(Continued)

OTHER PUBLICATIONS

Whang, SungJin et al. "Novel 3-dimensional Dual Control-gate with Surrounding Floating-gate (DC-SF) NAND flash cell for 1Tb file storage application," 2010 IEEE Int'l Electron Devices Meeting (IEDM), Dec. 6-8, 2010, 4 pages.

(Continued)

*Primary Examiner* — Michael Jared Walker
(74) *Attorney, Agent, or Firm* — Haynes Beffel & Wolfeld LLP; Paul Durdik

(57) ABSTRACT

An AI inference platform comprises a logic die including an array of AI processing elements. Each AI processing element including an activation memory storing activation data for use in neural network computations. The platform includes a memory die that includes an array of 3D memory cells and (Continued)

a page buffer that facilitates storage and retrieval of neural network weights for use in neural network computations. A plurality of vertical connections can directly connect AI processing elements in the logic die and page buffers of corresponding ones of the memory cells in the memory die, enabling storage or retrieval of a neural network weight to and from a particular page buffer of a corresponding 3D memory cell for use in neural network computations conducted by a corresponding AI processing element in the logic die.

19 Claims, 8 Drawing Sheets

(56)                References Cited

U.S. PATENT DOCUMENTS

| | | | | |
|---|---|---|---|---|
| 5,963,803 | A * | 10/1999 | Dawson | H10D 84/0184 |
| | | | | 438/231 |
| 6,034,882 | A * | 3/2000 | Johnson | G11C 17/16 |
| | | | | 365/103 |
| 6,107,882 | A * | 8/2000 | Gabara | H03F 3/45237 |
| | | | | 330/253 |
| 6,313,486 | B1 * | 11/2001 | Kencke | H10D 30/685 |
| | | | | 257/191 |
| 6,385,097 | B1 * | 5/2002 | Liao | G11C 7/1051 |
| | | | | 365/189.09 |
| 6,486,027 | B1 * | 11/2002 | Noble | H10B 69/00 |
| | | | | 438/257 |
| 6,593,624 | B2 * | 7/2003 | Walker | H10D 88/00 |
| | | | | 257/E27.102 |
| 6,829,598 | B2 * | 12/2004 | Milev | G11C 11/56 |
| | | | | 706/26 |
| 6,856,542 | B2 * | 2/2005 | Roy | H10B 41/30 |
| | | | | 257/E27.103 |
| 6,906,940 | B1 * | 6/2005 | Lue | G11C 5/025 |
| | | | | 257/E27.102 |
| 6,960,499 | B2 * | 11/2005 | Nandakumar | H01L 21/2652 |
| | | | | 257/E21.337 |
| 7,081,377 | B2 * | 7/2006 | Cleeves | H10B 99/16 |
| | | | | 257/E27.073 |
| 7,089,218 | B1 * | 8/2006 | Visel | G06N 3/02 |
| | | | | 706/14 |
| 7,129,538 | B2 | 10/2006 | Lee et al. | |
| 7,177,169 | B2 * | 2/2007 | Scheuerlein | H10B 69/00 |
| | | | | 365/96 |
| 7,368,358 | B2 * | 5/2008 | Ouyang | H10D 84/0167 |
| | | | | 438/300 |
| 7,436,723 | B2 * | 10/2008 | Rinerson | G11C 13/004 |
| | | | | 365/158 |
| 7,593,908 | B2 * | 9/2009 | Abdulkader | G06F 18/214 |
| | | | | 382/187 |
| 7,646,041 | B2 * | 1/2010 | Chae | H10D 30/681 |
| | | | | 438/257 |
| 7,747,668 | B2 * | 6/2010 | Nomura | G06N 3/063 |
| | | | | 708/603 |
| 7,948,024 | B2 * | 5/2011 | Kim | H10B 41/20 |
| | | | | 257/E21.652 |
| 8,045,355 | B2 * | 10/2011 | Ueda | G11C 7/14 |
| | | | | 365/158 |
| 8,154,128 | B2 * | 4/2012 | Lung | H10D 88/00 |
| | | | | 257/E23.145 |
| 8,203,187 | B2 * | 6/2012 | Lung | G11C 16/0458 |
| | | | | 438/257 |
| 8,275,728 | B2 | 9/2012 | Pino | |
| 8,331,149 | B2 * | 12/2012 | Choi | H10D 30/0413 |
| | | | | 257/329 |
| 8,432,719 | B2 * | 4/2013 | Lue | H10B 41/27 |
| | | | | 365/185.26 |
| 8,564,045 | B2 * | 10/2013 | Liu | H10B 43/27 |
| | | | | 438/266 |
| 8,589,320 | B2 * | 11/2013 | Breitwisch | G06N 3/065 |
| | | | | 706/15 |
| 8,630,114 | B2 | 1/2014 | Lue | |
| 8,725,670 | B2 | 5/2014 | Visel | |
| 8,860,124 | B2 * | 10/2014 | Lue | H10B 43/30 |
| | | | | 257/326 |
| 9,064,903 | B2 * | 6/2015 | Mitchell | H01L 21/2652 |
| 9,111,617 | B2 * | 8/2015 | Shim | G11C 16/0483 |
| 9,147,468 | B1 * | 9/2015 | Lue | H10B 43/35 |
| 9,177,966 | B1 * | 11/2015 | Rabkin | H10D 64/037 |
| 9,213,936 | B2 | 12/2015 | Visel | |
| 9,379,129 | B1 * | 6/2016 | Lue | H10B 43/20 |
| 9,391,084 | B2 * | 7/2016 | Lue | H10B 43/00 |
| 9,397,110 | B2 | 7/2016 | Lue | |
| 9,401,371 | B1 * | 7/2016 | Lee | H10B 43/27 |
| 9,430,735 | B1 * | 8/2016 | Vali | G11C 16/08 |
| 9,431,099 | B2 * | 8/2016 | Lee | G11C 11/54 |
| 9,520,485 | B2 * | 12/2016 | Lue | H10D 30/6735 |
| 9,524,980 | B2 * | 12/2016 | Lue | H01L 23/528 |
| 9,535,831 | B2 | 1/2017 | Jayasena et al. | |
| 9,536,969 | B2 * | 1/2017 | Yang | H10D 30/696 |
| 9,589,982 | B1 * | 3/2017 | Cheng | H10B 41/20 |
| 9,698,156 | B2 * | 7/2017 | Lue | H10B 43/10 |
| 9,698,185 | B2 * | 7/2017 | Chen | H10F 39/80377 |
| 9,710,747 | B2 * | 7/2017 | Kang | G06N 3/063 |
| 9,747,230 | B2 | 8/2017 | Han et al. | |
| 9,754,953 | B2 * | 9/2017 | Tang | H10B 41/30 |
| 9,767,028 | B2 | 9/2017 | Cheng et al. | |
| 9,898,207 | B2 | 2/2018 | Kim et al. | |
| 9,910,605 | B2 | 3/2018 | Jayasena et al. | |
| 9,922,716 | B2 * | 3/2018 | Hsiung | G11C 16/26 |
| 9,978,454 | B2 | 5/2018 | Jung | |
| 9,983,829 | B2 * | 5/2018 | Ravimohan | G06F 12/0246 |
| 9,991,007 | B2 * | 6/2018 | Lee | G11C 29/1201 |
| 10,037,167 | B2 * | 7/2018 | Kwon | G06F 9/4881 |
| 10,043,819 | B1 * | 8/2018 | Lai | H10B 43/20 |
| 10,056,149 | B2 * | 8/2018 | Yamada | G11C 16/16 |
| 10,073,733 | B1 * | 9/2018 | Jain | G06F 11/1044 |
| 10,157,012 | B2 * | 12/2018 | Kelner | G06F 21/00 |
| 10,175,667 | B2 * | 1/2019 | Bang | G05B 15/02 |
| 10,211,218 | B2 | 2/2019 | Lue | |
| 10,242,737 | B1 * | 3/2019 | Lin | G06N 3/065 |
| 10,381,376 | B1 * | 8/2019 | Nishikawa | H10D 88/00 |
| 10,403,637 | B2 * | 9/2019 | Lue | H01L 21/76877 |
| 10,528,643 | B1 * | 1/2020 | Choi | G06F 17/16 |
| 10,534,840 | B1 * | 1/2020 | Petti | G11C 11/54 |
| 10,540,591 | B2 * | 1/2020 | Gao | G06N 3/0895 |
| 10,552,759 | B2 * | 2/2020 | Rich | G06N 5/022 |
| 10,565,494 | B2 | 2/2020 | Henry et al. | |
| 10,635,398 | B2 | 4/2020 | Lin et al. | |
| 10,643,713 | B1 * | 5/2020 | Louie | G11C 16/26 |
| 10,719,296 | B2 | 7/2020 | Lee et al. | |
| 10,777,566 | B2 | 9/2020 | Lue | |
| 10,783,963 | B1 * | 9/2020 | Hung | G11C 16/0416 |
| 10,790,023 | B2 | 9/2020 | Harari | |
| 10,790,828 | B1 * | 9/2020 | Gunter | G06N 3/0464 |
| 10,825,510 | B2 * | 11/2020 | Jaiswal | G11C 11/412 |
| 10,860,682 | B2 * | 12/2020 | Knag | G11C 11/56 |
| 10,880,994 | B2 * | 12/2020 | Aoki | H05K 3/3494 |
| 10,910,393 | B2 | 2/2021 | Lai et al. | |
| 10,942,673 | B2 | 3/2021 | Shafiee Ardestani et al. | |
| 10,957,392 | B2 * | 3/2021 | Lee | G11C 16/10 |
| 11,069,704 | B2 * | 7/2021 | Lai | H10D 64/037 |
| 11,127,108 | B2 * | 9/2021 | Sharma | G06T 1/20 |
| 11,171,115 | B2 * | 11/2021 | Manipatruni | H01L 24/73 |
| 11,397,886 | B2 * | 7/2022 | Hoang | G06N 3/045 |
| 11,410,028 | B2 * | 8/2022 | Crill | G06N 3/09 |
| 11,443,407 | B2 | 9/2022 | Sharma et al. | |
| 11,544,547 | B2 * | 1/2023 | Kulkarni | G06N 3/0464 |
| 11,568,228 | B2 * | 1/2023 | Hoang | G06F 3/0604 |
| 11,663,471 | B2 * | 5/2023 | Hoang | G06N 3/0495 |
| | | | | 706/17 |
| 11,694,940 | B1 * | 7/2023 | Mathuriya | G11C 11/005 |
| | | | | 257/295 |
| 11,704,211 | B1 * | 7/2023 | Kaplan | G06F 11/1666 |
| | | | | 714/6.13 |
| 11,764,190 | B1 * | 9/2023 | Manipatruni | G11C 11/419 |
| | | | | 257/777 |

(56) References Cited

U.S. PATENT DOCUMENTS

| 11,784,164 | B2 * | 10/2023 | Dokania | H01L 23/544 |
| | | | | 257/690 |
| 11,836,102 | B1 * | 12/2023 | Mathuriya | H01L 25/18 |
| 11,844,223 | B1 * | 12/2023 | Mathuriya | G11C 11/4097 |
| 11,899,613 | B1 * | 2/2024 | Mathuriya | H01L 23/5385 |
| 11,922,995 | B2 * | 3/2024 | Troia | G06N 3/06 |
| 12,079,475 | B1 * | 9/2024 | Mathuriya | G11C 11/4093 |
| 12,079,733 | B2 * | 9/2024 | Hoang | G06N 3/0495 |
| 12,086,410 | B1 * | 9/2024 | Mathuriya | H01L 25/18 |
| 12,205,008 | B2 * | 1/2025 | Ma | G11C 11/1659 |
| 12,299,597 | B2 * | 5/2025 | Lung | G06N 3/063 |
| 12,307,354 | B2 * | 5/2025 | Zhang | G06F 7/5235 |
| 12,456,040 | B2 * | 10/2025 | Zhang | G11C 11/5628 |
| 2001/0055838 | A1 * | 12/2001 | Walker | H10D 84/038 |
| | | | | 257/E27.071 |
| 2002/0028541 | A1 * | 3/2002 | Lee | G11C 16/26 |
| | | | | 438/149 |
| 2003/0122181 | A1 * | 7/2003 | Wu | G11C 16/0491 |
| | | | | 257/315 |
| 2005/0088878 | A1 * | 4/2005 | Eshel | G11C 16/28 |
| | | | | 365/185.28 |
| 2005/0280061 | A1 * | 12/2005 | Lee | H10D 88/00 |
| | | | | 257/296 |
| 2005/0287793 | A1 * | 12/2005 | Blanchet | H01L 23/485 |
| | | | | 257/E21.585 |
| 2007/0158736 | A1 * | 7/2007 | Arai | H10B 43/27 |
| | | | | 257/E21.679 |
| 2008/0101109 | A1 * | 5/2008 | Haring-Bolivar | H10N 70/828 |
| | | | | 365/163 |
| 2008/0117678 | A1 * | 5/2008 | Shieh | G11C 11/5642 |
| | | | | 365/185.2 |
| 2009/0097321 | A1 * | 4/2009 | Kim | H10D 30/0411 |
| | | | | 438/257 |
| 2009/0184360 | A1 * | 7/2009 | Jin | H10D 64/035 |
| | | | | 257/E21.409 |
| 2010/0172189 | A1 * | 7/2010 | Itagaki | G11C 16/0483 |
| | | | | 365/185.29 |
| 2010/0182828 | A1 * | 7/2010 | Shima | H10B 63/84 |
| | | | | 257/E47.001 |
| 2010/0202208 | A1 * | 8/2010 | Endo | H10B 41/30 |
| | | | | 257/369 |
| 2010/0270593 | A1 * | 10/2010 | Lung | H10B 43/27 |
| | | | | 257/E21.532 |
| 2011/0018051 | A1 * | 1/2011 | Kim | H10B 43/20 |
| | | | | 257/314 |
| 2011/0063915 | A1 * | 3/2011 | Tanaka | G11C 16/32 |
| | | | | 365/205 |
| 2011/0106742 | A1 * | 5/2011 | Pino | G06N 3/065 |
| | | | | 706/33 |
| 2011/0128791 | A1 * | 6/2011 | Chang | G11C 16/14 |
| | | | | 365/185.33 |
| 2011/0140070 | A1 * | 6/2011 | Kim | G11C 11/5678 |
| | | | | 257/E27.002 |
| 2011/0194357 | A1 * | 8/2011 | Han | G11C 16/16 |
| | | | | 365/185.29 |
| 2011/0286258 | A1 * | 11/2011 | Chen | G11C 13/004 |
| | | | | 365/189.16 |
| 2011/0297912 | A1 * | 12/2011 | Samachisa | G11C 13/003 |
| | | | | 257/E45.001 |
| 2012/0007167 | A1 * | 1/2012 | Hung | H10B 43/20 |
| | | | | 257/E21.645 |
| 2012/0044742 | A1 * | 2/2012 | Narayanan | G11C 13/003 |
| | | | | 365/148 |
| 2012/0112264 | A1 * | 5/2012 | Lee | H10D 62/115 |
| | | | | 257/E27.026 |
| 2012/0182801 | A1 * | 7/2012 | Lue | H10B 20/25 |
| | | | | 365/185.05 |
| 2012/0235111 | A1 * | 9/2012 | Osano | H10B 63/20 |
| | | | | 257/4 |
| 2012/0254087 | A1 | 10/2012 | Visel | |
| 2013/0070528 | A1 * | 3/2013 | Maeda | H10B 43/35 |
| | | | | 365/185.11 |
| 2013/0075684 | A1 * | 3/2013 | Kinoshita | H10N 70/826 |
| | | | | 977/773 |
| 2013/0119455 | A1 * | 5/2013 | Chen | H10B 43/20 |
| | | | | 257/E21.423 |
| 2014/0043898 | A1 * | 2/2014 | Kuo | G11C 11/5628 |
| | | | | 365/185.12 |
| 2014/0063949 | A1 * | 3/2014 | Tokiwa | G11C 16/0483 |
| | | | | 365/185.11 |
| 2014/0119127 | A1 * | 5/2014 | Lung | G11C 16/10 |
| | | | | 365/185.21 |
| 2014/0149773 | A1 * | 5/2014 | Huang | G11C 13/0007 |
| | | | | 713/323 |
| 2014/0268996 | A1 * | 9/2014 | Park | H10B 61/22 |
| | | | | 365/148 |
| 2014/0330762 | A1 | 11/2014 | Msel | |
| 2015/0008500 | A1 * | 1/2015 | Fukumoto | H10D 30/681 |
| | | | | 257/314 |
| 2015/0170001 | A1 * | 6/2015 | Rabinovich | G06F 18/214 |
| | | | | 382/110 |
| 2015/0171106 | A1 * | 6/2015 | Suh | H10D 62/832 |
| | | | | 438/269 |
| 2015/0179661 | A1 * | 6/2015 | Huo | H01L 21/02181 |
| | | | | 257/315 |
| 2015/0199126 | A1 * | 7/2015 | Jayasena | G06F 12/0292 |
| | | | | 711/170 |
| 2015/0331817 | A1 * | 11/2015 | Han | G06F 3/0611 |
| | | | | 710/308 |
| 2015/0340369 | A1 * | 11/2015 | Lue | H10D 64/037 |
| | | | | 365/185.17 |
| 2016/0043100 | A1 * | 2/2016 | Lee | H10D 30/6757 |
| | | | | 257/324 |
| 2016/0141299 | A1 * | 5/2016 | Hong | H10B 41/35 |
| | | | | 438/157 |
| 2016/0141337 | A1 * | 5/2016 | Shimabukuro | H10N 70/8845 |
| | | | | 365/51 |
| 2016/0181315 | A1 * | 6/2016 | Lee | H10N 50/10 |
| | | | | 257/421 |
| 2016/0232973 | A1 * | 8/2016 | Jung | G11C 16/3427 |
| 2016/0247579 | A1 * | 8/2016 | Ueda | G11C 19/184 |
| 2016/0308114 | A1 * | 10/2016 | Kim | H10B 63/30 |
| 2016/0329341 | A1 * | 11/2016 | Shimabukuro | H10B 41/35 |
| 2016/0336064 | A1 * | 11/2016 | Seo | G11C 13/0002 |
| 2016/0342892 | A1 * | 11/2016 | Ross | G06F 15/8046 |
| 2016/0342893 | A1 * | 11/2016 | Ross | G06N 5/04 |
| 2016/0343421 | A1 * | 11/2016 | Pyo | G11C 5/04 |
| 2016/0358661 | A1 | 12/2016 | Vali et al. | |
| 2016/0379115 | A1 * | 12/2016 | Burger | G06N 3/09 |
| | | | | 706/25 |
| 2017/0003889 | A1 * | 1/2017 | Kim | G06F 3/0659 |
| 2017/0025421 | A1 * | 1/2017 | Sakakibara | H10B 43/35 |
| 2017/0084748 | A1 * | 3/2017 | Yang | H10B 41/30 |
| 2017/0091313 | A1 * | 3/2017 | Chalabi | G06F 16/958 |
| 2017/0092370 | A1 * | 3/2017 | Harari | H10D 64/037 |
| 2017/0103316 | A1 * | 4/2017 | Ross | G06N 3/045 |
| 2017/0123987 | A1 * | 5/2017 | Cheng | G06F 15/7821 |
| 2017/0148517 | A1 * | 5/2017 | Harari | H10D 62/83 |
| 2017/0160955 | A1 | 6/2017 | Jayasena et al. | |
| 2017/0169885 | A1 * | 6/2017 | Tang | G11C 29/028 |
| 2017/0169887 | A1 * | 6/2017 | Widjaja | H10D 62/115 |
| 2017/0243879 | A1 * | 8/2017 | Yu | H01L 21/32 |
| 2017/0263623 | A1 * | 9/2017 | Zhang | H01L 21/02636 |
| 2017/0270405 | A1 * | 9/2017 | Kurokawa | H10D 86/60 |
| 2017/0287928 | A1 * | 10/2017 | Kanamori | H01L 23/528 |
| 2017/0309634 | A1 * | 10/2017 | Noguchi | H10B 41/27 |
| 2017/0316833 | A1 * | 11/2017 | Ihm | G11C 16/0483 |
| 2017/0317096 | A1 * | 11/2017 | Shin | H10B 43/50 |
| 2017/0337466 | A1 * | 11/2017 | Bayat | G06F 3/061 |
| 2018/0113649 | A1 * | 4/2018 | Shafiee Ardestani | G06N 3/063 |
| 2018/0121790 | A1 * | 5/2018 | Kim | G06N 3/063 |
| 2018/0129424 | A1 * | 5/2018 | Confalonieri | G06F 3/0685 |
| 2018/0129936 | A1 * | 5/2018 | Young | G06N 3/045 |
| 2018/0144240 | A1 * | 5/2018 | Garbin | G11C 13/003 |
| 2018/0157488 | A1 * | 6/2018 | Shu | G06F 9/30029 |
| 2018/0173420 | A1 * | 6/2018 | Li | G06F 3/0679 |
| 2018/0182776 | A1 * | 6/2018 | Kim | H10D 30/693 |
| 2018/0189640 | A1 * | 7/2018 | Henry | G06N 3/0464 |
| 2018/0240522 | A1 * | 8/2018 | Jung | G06F 3/064 |

(56) References Cited

U.S. PATENT DOCUMENTS

| | | | | |
|---|---|---|---|---|
| 2018/0246783 A1* | 8/2018 | Avraham | | H03M 13/27 |
| 2018/0247195 A1* | 8/2018 | Kumar | | G06N 3/08 |
| 2018/0285726 A1* | 10/2018 | Baum | | G06F 30/30 |
| 2018/0286874 A1* | 10/2018 | Kim | | H10B 43/35 |
| 2018/0321942 A1* | 11/2018 | Yu | | G06F 9/30036 |
| 2018/0342299 A1 | 11/2018 | Yamada et al. | | |
| 2018/0350823 A1* | 12/2018 | Or-Bach | | H10B 43/20 |
| 2019/0019538 A1* | 1/2019 | Li | | G06N 3/088 |
| 2019/0019564 A1* | 1/2019 | Li | | G06N 3/049 |
| 2019/0035449 A1* | 1/2019 | Saida | | G06N 3/065 |
| 2019/0043560 A1* | 2/2019 | Sumbul | | G06N 3/08 |
| 2019/0050714 A1* | 2/2019 | Nosko | | G06N 3/082 |
| 2019/0065151 A1* | 2/2019 | Chen | | G06F 17/16 |
| 2019/0073564 A1* | 3/2019 | Saliou | | G06V 10/774 |
| 2019/0073565 A1* | 3/2019 | Saliou | | G06N 3/045 |
| 2019/0088329 A1* | 3/2019 | Tiwari | | G11C 16/24 |
| 2019/0102170 A1* | 4/2019 | Chen | | G11C 7/16 |
| 2019/0138891 A1* | 5/2019 | Kim | | G06N 3/045 |
| 2019/0138892 A1* | 5/2019 | Kim | | G06N 3/0464 |
| 2019/0148393 A1* | 5/2019 | Lue | | H10D 88/00 |
| | | | | 365/185.05 |
| 2019/0164044 A1* | 5/2019 | Song | | G06N 3/065 |
| 2019/0164617 A1* | 5/2019 | Tran | | G11C 11/54 |
| 2019/0213234 A1* | 7/2019 | Bayat | | G06N 3/04 |
| 2019/0220249 A1* | 7/2019 | Lee | | G11C 16/0483 |
| 2019/0244662 A1* | 8/2019 | Lee | | H10B 63/30 |
| 2019/0286419 A1* | 9/2019 | Lin | | G11C 13/0004 |
| 2019/0311243 A1* | 10/2019 | Whatmough | | G06N 3/045 |
| 2019/0311749 A1* | 10/2019 | Song | | G11C 5/145 |
| 2019/0325959 A1* | 10/2019 | Bhargava | | G11C 13/0023 |
| 2019/0340497 A1* | 11/2019 | Baraniuk | | G06F 18/24143 |
| 2019/0349426 A1* | 11/2019 | Smith | | H04L 63/123 |
| 2019/0363131 A1* | 11/2019 | Torng | | G06N 3/08 |
| 2020/0026993 A1* | 1/2020 | Otsuka | | G11C 11/54 |
| 2020/0034148 A1* | 1/2020 | Sumbul | | G06F 17/153 |
| 2020/0065650 A1* | 2/2020 | Tran | | G11C 16/30 |
| 2020/0098784 A1* | 3/2020 | Nagashima | | H01L 21/31116 |
| 2020/0098787 A1* | 3/2020 | Kaneko | | H10B 41/10 |
| 2020/0110990 A1* | 4/2020 | Harada | | G11C 11/54 |
| 2020/0117986 A1* | 4/2020 | Burr | | G06F 17/15 |
| 2020/0118638 A1* | 4/2020 | Leobandung | | G11C 27/00 |
| 2020/0143248 A1* | 5/2020 | Liu | | G06N 20/00 |
| 2020/0160165 A1* | 5/2020 | Sarin | | G06F 7/49942 |
| 2020/0227432 A1* | 7/2020 | Lai | | H10B 43/35 |
| 2020/0334015 A1* | 10/2020 | Shibata | | H10D 84/00 |
| 2020/0343252 A1* | 10/2020 | Lai | | H10B 43/10 |
| 2020/0349093 A1* | 11/2020 | Malladi | | G06F 12/0207 |
| 2020/0365611 A1* | 11/2020 | Hung | | H10D 64/252 |
| 2020/0381450 A1* | 12/2020 | Lue | | H10D 30/69 |
| 2020/0395309 A1* | 12/2020 | Cheah | | H01L 23/5389 |
| 2020/0402997 A1* | 12/2020 | Ahn | | H10B 43/27 |
| 2021/0125040 A1* | 4/2021 | Cassidy | | G11C 11/54 |
| 2021/0125042 A1* | 4/2021 | Han | | G06N 3/0495 |
| 2021/0157737 A1* | 5/2021 | Gu | | G06F 9/3877 |
| 2021/0168230 A1* | 6/2021 | Baker | | G06F 1/1635 |
| 2021/0209468 A1* | 7/2021 | Matsumoto | | G06N 3/09 |
| 2021/0240945 A1* | 8/2021 | Strachan | | G06J 1/00 |
| 2022/0231687 A1* | 7/2022 | Dabral | | H01L 25/0652 |
| 2022/0284657 A1* | 9/2022 | Müller | | G06N 3/09 |
| 2022/0358354 A1* | 11/2022 | Hoang | | G06N 3/09 |
| 2023/0059491 A1* | 2/2023 | Dokania | | H01L 23/3672 |
| 2023/0101654 A1* | 3/2023 | Nava Rodriguez | | G06T 15/005 |
| | | | | 345/426 |
| 2023/0153587 A1* | 5/2023 | Vogelsang | | G11C 5/025 |
| | | | | 706/25 |
| 2024/0064044 A1* | 2/2024 | Liu | | H04L 25/024 |
| 2024/0281142 A1* | 8/2024 | Lung | | G06F 13/161 |
| 2024/0281636 A1* | 8/2024 | Kuo | | G06N 3/045 |
| 2024/0311006 A1* | 9/2024 | Mathuriya | | H01L 23/49827 |

FOREIGN PATENT DOCUMENTS

| CN | 103778468 A | 5/2014 |
|---|---|---|
| CN | 105718994 A | 6/2016 |
| CN | 105789139 A | 7/2016 |
| CN | 106530210 A | 3/2017 |
| CN | 106815515 A | 6/2017 |
| CN | 107368892 A | 11/2017 |
| CN | 107533459 A | 1/2018 |
| CN | 107767905 A | 3/2018 |
| CN | 108268946 A | 7/2018 |
| CN | 110598752 A | 12/2019 |
| EP | 2048709 A2 | 4/2009 |
| IN | 107077879 A | 8/2017 |
| JP | H0451382 A | 2/1992 |
| JP | 2006127623 A | 5/2006 |
| JP | 2009080892 A | 4/2009 |
| TW | 201108230 A | 3/2011 |
| TW | 201523838 A | 6/2015 |
| TW | 201618284 A | 5/2016 |
| TW | 201639206 A | 11/2016 |
| TW | 201715525 A | 5/2017 |
| TW | 201732824 A | 9/2017 |
| TW | 201741943 A | 12/2017 |
| TW | 201802800 A | 1/2018 |
| TW | 201807807 A | 3/2018 |
| TW | 201822203 A | 6/2018 |
| TW | 201921297 A | 6/2019 |
| TW | 201939717 A | 10/2019 |
| TW | 202004573 A | 1/2020 |
| TW | 202011285 A | 3/2020 |
| TW | 202040505 A | 11/2020 |
| TW | 202046179 A | 12/2020 |
| TW | 202103307 A | 1/2021 |
| TW | 202122994 A | 6/2021 |
| TW | 202129509 A | 8/2021 |
| TW | 202219590 A | 5/2022 |
| WO | 2012009179 A1 | 1/2012 |
| WO | 2012015450 A1 | 2/2012 |
| WO | 2016060617 A1 | 4/2016 |
| WO | 2016084336 A1 | 6/2016 |
| WO | 2017091338 A1 | 6/2017 |
| WO | 2018201060 A1 | 11/2018 |

OTHER PUBLICATIONS

Y.X. Liu et al., "Comparative Study of Tri-Gate and Double-Gate-Type Poly-Si Fin-Channel Spli-Gate Flash Memories," 2012 IEEE Silicon Nanoelectronics Workshop (SNW), Honolulu, HI, Jun. 10-11, 2012, pp. 1-2.

Anonymous, "Data In The Computer", May 11, 2015, pp. 1-8, https://web.archive.org/web/20150511143158/ https:// homepage.cs.uri .edu/faculty/wolfe/book/Readings/Reading02.htm (Year. 2015)—See Office Action dated Aug. 17, 2020 in U.S. Appl. No. 16/279,494 for relevance—no year provided.

Aritome, et al., "Reliability issues of flash memory cells," Proc. of the IEEE, vol. 81, No. 5, May 1993, pp. 776-788.

Beasley, "Manufacturing Defects," may be found at https://slideplayer. com/slide/11407304, downloaded May 20, 2020, 61 pages.

Chen et al., "A Highly Pitch Scalable 3D Vertical Gate (VG) NAND Flash Decoded by a Novel Self-Aligned Independently Controlled Double Gate (IDG) StringSelect Transistor (SSL)," 2012 Symp. on VLSI Technology (VLSIT), Jun. 12-14, 2012, pp. 91-92.

Chen et al., "Eyeriss: An Energy-Efficient reconfigurable accelerator for deep convolutional neural networks," IEEE Sscc, Jan. 31-Feb. 4, 2016, 3 pages.

Choi et al., "Performance Breakthrough in NOR Flash Memory with Dopant-Segregated Schottky-Barrier (DSSB) SONOS Device", 2009 Symposium onVLSI Technology Digest of Technical Papers, Jun. 16-18, 2009, pp. 1-2.

Entegris FAQ Series, "Contamination Control in Ultrapure Chemicals and Water: Fundamentals of Contamination Control," may be found at https://www.entegris.com/en/home/resources/technical-information/faq/contamination-control-in-ultrapure-chemicals-and-water.html., downloaded May 20, 2020, 10 pages.

Fukuzumi et al. "Optimal Integration and Characteristics of Vertical Array Devices for Ultra-High Density, Bit-Cost Scalable Flash Memory," IEEE Dec. 2007, pp. 449-452.

(56) References Cited

OTHER PUBLICATIONS

Gonugondla et al., "Energy-Efficient Deep In-memory Architecture for NAND Flash Memories," IEEE International Symposium on Circuits and Systems (ISCAS), May 27-30, 2018, 5 pages.
Guo et al., "Fast, energy-efficient, robust, and reproducible mixed-signal neuromorphic classifier based on embedded NOR flash memory technology," IEEE Int'l Electron Devices Mtg., San Francisco, CA, Dec. 2-6, 2017, 4 pages.
Hsu et al., "Study of Sub-30nm Thin Film Transistor (TFT) Charge-Trapping (CT) Devices for 3D NAND Flash Application", IEDM 2009 IEEE International, Dec. 7-9, 2009, p. 1-4.
Hubert et al., "A Stacked SONOS Technology, Up to 4 Levels and 6nm Crystalline Nanowires, With Gate-All-Around on Independent Gates (Flash), Suitable for Full 3D Integration," IEEE 2009, Dec. 7-9, 2009, pp. 27.6.1-27.6.4.
Hung et al., "A highly scalable vertical gate (VG) 3D NAND Flash with robust program disturb immunity using a novel PN diode decoding structure," 2011 Symp. on VLSI Technology (VLSIT), Jun. 14-16, 2011, pp. 68-69.
IMEC Magazine, Mar. 2018, 35 pages.
Jang et al., "Vertical Cell Array Using TCAT (Terabit Cell Array Transistor) Technology for Ultra High Density NAND Flash Memory," 2009 Symposium on VLSI Technology Digest of Technical Papers, Jun. 16-18, 2009, pp. 192-193.
Johnson et al., "512-Mb PROM With a Three-Dimensional Array of Diode/Antifuse Memory Cells," IEEE Journal of Solid-State Circuits, vol. 38, No. 11, Nov. 2003, pp. 1920-1928.
Jung et al., "Three Dimensionally Stacked NAND Flash Memory Technology Using Stacking Single Crystal Si Layers on ILD and TANOS Structure for Beyond 30nm Node," International Electron Devices Meeting, 2006. IEDM '06, Dec. 11-13, 2006, pp. 1-4.
Katsumata et al., "Pipe-shaped BiCS flash memory with 16 stacked layers and multi-level-cell operation for ultra high density storage devices," 2009 Symp. on VLSI Technology, Jun. 16-18, 2009, 2 pages.
Kim et al. "Novel Vertical-Stacked-Array-Transistor (VSAT) for Ultra-High-Density and Cost-Effective NAND Flash Memory Devices and SSD (Solid State Drive)", Jun. 2009 Symposium on VLSI Technolgy Digest of Technical Papers, pp. 186-187. (cited in parent).
Kim et al., "Multi-Layered Vertical Gate NAND Flash Overcoming Stacking Limit for Terabit Density Storage," 2009 Symposium on VLSI Technology Digest of Technical Papers, Jun. 16-18, 2009, pp. 188-189.
Kim et al., "Novel 3-D Structure for Ultra High Density Flash Memory with VRAT (Vertical-Recess-Array-Transistor) and PIPE (Planarized Integration on the same PlanE)," IEEE 2008 Symposium on VLSI Technology Digest of Technical Papers, Jun. 17-19, 2008, pp. 122-123.
Kim et al., "Three-Dimensional NAND Flash Architecture Design Based on Single-Crystalline STacked ARray," IEEE Transactions on Electron Devices, vol. 59, No. 1, pp. 35-45, Jan. 2012.
Kim, "Abrasive for Chemical Mechanical Polishing. Abrasive Technology: Characteristics and Applications," Book Abrasive Technology: Characteristics and Applications, Mar. 2018, 20 pages.
Lai et al. "Highly Reliable MA BE-SONOS (Metal-Al2O3 Bandgap Engineered SONOS) Using a SiO2 Buffer Layer," VLSI Technology, Systems and Applications 2008, VLSI-TSA International Symposium on Apr. 21-23, 2008, pp. 58-59, cited by applicant.
Lai et al., "A Multi-Layer Stackable Thin-Film Transistor (TFT) NAND-Type Flash Memory," Electron Devices Meeting, 2006, IEDM '06 International, Dec. 11-13, 2006, pp. 1-4.
Liu et al., "Parallelizing SRAM Arrays with Customized Bit-Cell for Binary Neural Networks," 55th ACM/ESDA/IEEE Design Automation Conference (DAC), Sep. 20, 2018, 4 pages.
Lue et al., "A Highly Scalable 8-Layer 3D Vertical-Gate (VG) TFT NAND Flash Using Junction-Free Buried Channel BE-SONOS Device", 2010 Symposium on VLSI Technology Digest of Technical Papers, pp. 131-132, Jun. 15-17, 2010.
Lue et al., "A Novel 3D AND-type NVM Architecture Capable of High-density, Low-power In-Memory Sum-of-Product Computation for Artificial Intelligence Application," IEEE VLSI, Jun. 18-22, 2018, 2 pages.
Lue et al., "A Novel Buried-Channel FinFET BE-SONOS NAND Flash with Improved Memory Window and Cycling Endurance", 2009 Symposium on VLSI Technology Digest of Technical Papers, p. 224-225. cited by applicant.
Meena, et al., "Overview of emerging nonvolatile memory technologies," Nanoscale Reearch Letters 9:526, Oct. 2, 2014, 34 pages.
Merrikh-Bayat et al., "High-Performance Mixed-Signal Neurocomputing with Nanoscale Flowting-Gate Memory Cell Arrays," in IEEE Transactions on Neural Netowrks and Learning Systems, vol. 29, No. 10, Oct. 2018, pp. 4782-4790.
Minghao Qi, "ECE 695Q Lecture 10: Optical Lithography—Resolution Enhancement Techniques," may be found at https://nanohub.org/resources/15325/watch?resid=24507, Spring 2016, 35 pages.
Nowak et al., "Intrinsic fluctuations in Vertical NAND flash memories," 2012 Symposium on VLSI Technology, Digest of Technical Papers, pp. 21-22, Jun. 12-14, 2012.
Ohzone et al., "Ion-Implanted Thin Polycrystalline-Silicon High-Value Resistors for High-Density Poly-Load Static RAM Applications," IEEE Trans. on Electron Devices, vol. ED-32, No. 9, Sep. 1985, 8 pages.
Paul et al., "Impact of a Process Variation on Nanowire and Nanotube Device Performance", IEEE Transactions on Electron Devices, vol. 54, No. 9, Sep. 2007, p. 2369-2376.
Rincon-Mora, et al., "Bandgaps in the crosshairs: What's the trim target?" IEEE, The Georgia Tech Analog & Power IC abroator, Oct. 18, 2006, 5 pages.
Rod Nussbaumer, "How is data transmitted through wires in the computer?", Aug. 27, 2015, pp. 1-3, https://www.quora.com/How-is-data-transmitted-through-wires-in-the-computer (Year: 2015)—See Office Action dated Aug. 17, 2020 in U.S. Appl. No. 16/279,494 for relevance—no year provided.
Sakai et al., "A Buried Giga-Ohm Resistor (BGR) Load Static RAM Cell," IEEE Symp. on VLSI Technology, Digest of Papers, Sep. 10-12, 1984, 2 pages.
Schuller et al., "Neuromorphic Computing: From Materials to Systems Architecture," US Dept. of Energy, Oct. 29-30, 2015, Gaithersburg, MD, 40 pages.
Scott Thornton, "What is DRAm (Dynamic Random Access Memory) vs SRAM?", Jun. 22, 2017, pp. 1-11, https://www.microcontrollertips.com/dram-vs-sram/ (Year: 2017)—See Office Action dated Aug. 17, 2020 in U.S. Appl. No. 16/279,494 for relevance—no year provided.
Seo et al., "A Novel 3-D Vertical FG NAND Flash Memory Cell Arrays Using the Separated Sidewall Control Gate (S-SCG) for Highly Reliable MLC Operation," 2011 3rd IEEE International Memory Workshop (IMW), May 22-25, 2011, 4 pages.
Soudry, et al. "Hebbian learning rules with memristors," Center for Communication and Information Technologies CCIT Report #840, Sep. 1, 2013, 16 pages.
Tanaka et al., "Bit Cost Scalable Technology with Punch and Plug Process for Ultra High Density Flash Memory," VLSI Technology, 2007 IEEE Symposium on Jun. 12-14, 2007, pp. 14-15.
The Nikon eReview, "KLA-Tencor Research Scientist Emphasizes Stochastic Challenges at LithoVision 2018," may be found at https://nikonereview.com/2018/kla-tencor-research-scientist-emphasizes-stochastic-challenges-at-lithovision—Spring 2018, 7 pages.
Wang et al., "Three-Dimensional NAND Flash for Vector-Matrix Multiplication," IEEE Trans. on Very Large Scale Integration Systems (VLSI), vol. 27, No. 4, Apr. 2019, 4 pages.
Wang, Michael, "Technology Trends on 3D-NAND Flash Storage", Impact 2011, Taipei, dated Oct. 20, 2011, found at www.impact.org.tw/2011/Files/NewsFile/201111110190.pdf.
Webopedia, "DRAM—dynamic random access memory", Jan. 21, 2017, pp. 1-3, https://web.archive.org/web/20170121124008/https://www.webopedia.com/TERM/D/DRAM.html (Year: 2017)—See Office Action dated Aug. 17, 2020 in U.S. Appl. No. 16/279,494 for relevance—no year provided.

(56)                     References Cited

OTHER PUBLICATIONS

Webopedia, "SoC", Oct. 5, 2011, pp. 1-2, https://web.archive.org/web/20111005173630/https://www.webopedia.com/ TERM/S/SoC. html (Year: 2011)—See Office Action dated Aug. 17, 2020 in U.S. Appl. No. 16/279,494 for relevance—no month provided.

Webopedia, "volatile memory", Oct. 9, 2017, pp. 1-4, https://web. archive.org/web/20171009201852/https://www.webopedia.com/ TERMN/volatile_memory.html (Year: 2017)—See Office Action dated Aug. 17, 2020 in U.S. Appl. No. 16/279,494 for relevance—no year provided.

Park, et al., "FPGA based implementation of deep neural networks using on-chip memory only." In 2016 IEEE International conference on acoustics, speech and signal processing (ICASSP), Mar. 2016, pp. 1011-1015.

Goplen et al., "Placement of 3D ICs with Thermal and Interlayer Via Considerations," 2007 44th ACM/IEEE Design Automation Conference, Jun. 4-8, 2007, pp. 626-631.

Tanaka et al., "Through-Silicon via Interconnection for 3D Integration Using Room-Temperature Bonding," in IEEE Transactions on Advanced Packaging, vol. 32, No. 4, Nov. 2009, pp. 746-753.

Temiz, et al., "Post-CMOS Processing and 3-D Integration Based on Dry-Film Lithography," in IEEE Transactions on Components, Packaging and Manufacturing Technology, vol. 3, No. 9, Sep. 2013, pp. 1458-1466.

Li, et al., "On-chip memory technology design space explorations for mobile deep neural network accelerators," Proceedings of the 56th Annual Design Automation Conference, Jun. 2, 2029, pp. 1-6.

* cited by examiner

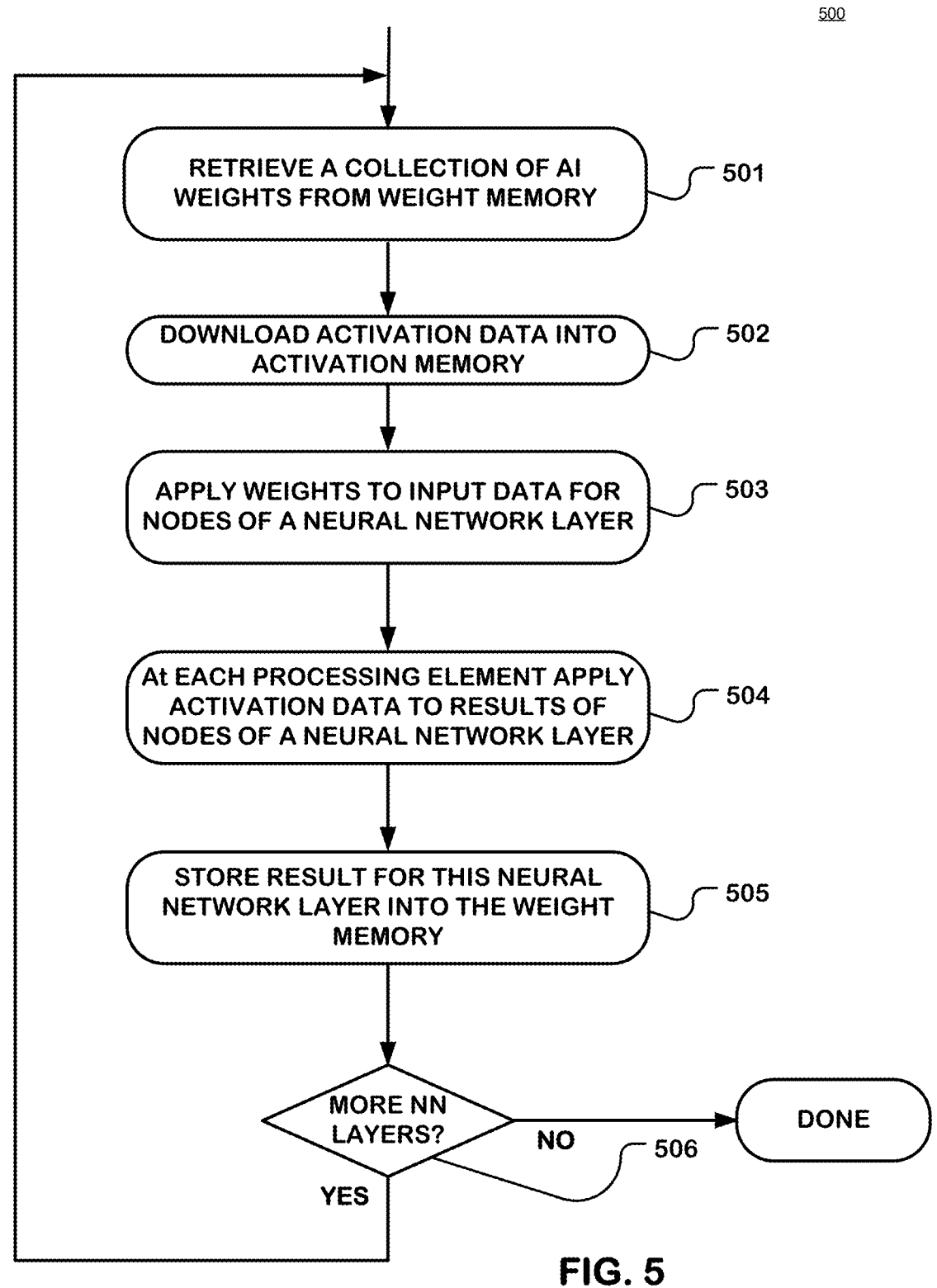

500

RETRIEVE A COLLECTION OF AI WEIGHTS FROM WEIGHT MEMORY ⌐ 501

DOWNLOAD ACTIVATION DATA INTO ACTIVATION MEMORY ⌐ 502

APPLY WEIGHTS TO INPUT DATA FOR NODES OF A NEURAL NETWORK LAYER ⌐ 503

At EACH PROCESSING ELEMENT APPLY ACTIVATION DATA TO RESULTS OF NODES OF A NEURAL NETWORK LAYER ⌐ 504

STORE RESULT FOR THIS NEURAL NETWORK LAYER INTO THE WEIGHT MEMORY ⌐ 505

MORE NN LAYERS?

NO ⌐ 506

YES

DONE

FIG. 5

Sigmoid 702

$$\sigma(z) = \frac{1}{1+e^{-z}}$$

ReLU 706

$$R(z) = \max(0, z)$$

Tanh 704

$$\Phi(z) = \tanh(z) = \frac{\sinh(z)}{\cosh(z)} = \frac{e^z - e^{-z}}{e^z + e^{-z}}$$

Leaky ReLU 708

$$R(z) = \{ \max(0, z) \text{ for } z \geq 0 \\ az \text{ for } z < 0\}$$

maxout 710

$$R(z) = \{ \max(z_i) \}$$

3D HYBRID BONDING 3D MEMORY DEVICES WITH NPU/CPU FOR AI INFERENCE APPLICATION

BACKGROUND

Field

The present invention relates to integrated circuit memory devices, such as 3D memory devices, e.g., 3D NAND, 3D AND, 3D NOR, configured in a high read endurance cell array configuration to support storage and retrieval of information at higher bandwidths that are useful for implementations of Artificial Intelligence (AI) inferencing applications, and particularly relates to an array die of layered 3D NAND memory cells coupled by 3D hybrid bonding to an array die of neural network processor units (NPU).

Description of Related Art

Modern information technology applications, such as artificial intelligence (AI) inferencing can consume copious amounts of data such as weighting information in conduct of inferencing operations.

Many different types of memory architectures have been created, each providing storage of digital data and addressing different needs and requirements of a variety of applications. However, conventional approaches to memory devices often suffer from insufficient bandwidth, leading to poor performance, or require refresh logic and are therefore higher in cost.

Numerous reads/writes especially in AI applications where there can be hundreds of millions of reads/writes, take up a lot of power (consumption) and time. Therefore, a need arises for an AI inference platform that has higher bandwidth and less power consumption by reducing the read/write time and the number of read/write iterations.

It is desirable to provide mechanisms for storing AI inferencing data that are capable of greater bandwidths.

SUMMARY

A high read endurance memory device is described suitable for providing neural network weight data to an AI accelerator processing core or cores. Processor in memory (PIM) architectural concepts are leveraged by using a plurality of 3D Copper to Copper (Cu-to-Cu) hybrid bond vias directly connecting a plurality of processing units (CPUs) in an N×M array on a logic die and corresponding 3D memories in an N×M array on a memory die, thereby establishing a high read endurance cell/array design. In some implementations, more planes can be added to the memories to achieve greater read bandwidth and faster sustained read speed suitable for ANN (Artificial Neuron network) weights access.

In a representative implementation, an artificial intelligence (AI) inference platform comprises a logic die that can include an N×M array of AI accelerator processing elements. Each such AI accelerator processing element can include an activation memory and an AI processor element. The activation memory can store activation data implementing one or more activation functions for use in neural network computations. The AI inference platform can include a memory die that can include an N×M array of cells implementing a weight memory and a page buffer. A page buffer facilitates storage and retrieval of neural network weights for use in neural network computations. A plurality of vertical connections can directly connect AI accelerator processing elements in the logic die and the page buffer of corresponding arrays in the memory die. In an embodiment, an AI processor element can conduct storage and/or retrieval of a neural network weight to and/or from a particular page buffer of a corresponding memory cell in the memory array for use in neural network computations conducted by a corresponding AI accelerator processing element in the logic die. Such direct connection can provide some embodiments with greater memory bandwidth.

In some implementations, AI accelerator processing elements implement neural processing units (NPU).

In one example implementation, the vertical connections comprise copper-to-copper hybrid bond vias.

In one example implementation, the memory die implements 3D NAND memory. In an embodiment, the array has a page buffer size of 16 Kilobytes.

In one example implementation, the 3D NAND memory cells comprise one of a multi-level cell (MLC) configuration, a triple-level cell (TLC) configuration, and a quad-level cell (QLC) configuration.

In one example implementation, the activation memory comprises a static random-access memory (SRAM) storing the activation data for use in neural network computations.

In one example implementation, the activation memory stores activation data including storing a non-linear function for relating relationships between input and output of a neural network. For example, storing activation data can include storing data implementing an activation function selected from at least one of a sigmoid function, a hyperbolic tangent (tanh) function, a rectified linear unit (ReLU) function, a leaky rectified linear unit (LReLU) function, and a maxout function.

In various example implementations, the activation memory can be any of a phase change memory (PCM), a NOR flash memory, a 3D AND flash memory, a resistive random-access memory (RRAM), a magneto-resistive random-access memory MRAM, a ferroelectric random-access memory FeRAM, a conductive bridge random-access memory CBRAM, and a 3D NAND flash memory. In some example implementations, the page buffer of a corresponding cell in the array of the memory die is incorporated into the memory die, such that no external buffer is located nor needed between the memory die and a corresponding processor element in the logic die.

In another aspect, an artificial intelligence (AI) inference memory device comprises a memory die including an array of 3D memory cells. Each such 3D memory cell, of the array of 3D memory array cells, can include a page buffer facilitating storage and retrieval of neural network weights for use in neural network computations. A plurality of vertical connections directly connect the page buffers of each of the 3D memory cells to a corresponding AI processing element in a logic die including an array of AI processing elements; thereby enabling a storage operation and/or a retrieval operation of a neural network weight to and from a particular page buffer of a corresponding 3D memory cell for use in neural network computations conducted by a corresponding AI processing element in the logic die.

In a further aspect, an artificial intelligence (AI) inference method for applying weight data from a high-bandwidth memory to neural network computations is provided. The method can include retrieving, by an AI processor element of a plurality of AI processor elements arrayed on a logic die, a plurality of neural network weights stored in a corresponding 3D memory cell of a plurality of 3D memory cells arrayed on a memory die. The AI processor element is directly connected to the corresponding 3D memory cell by a plurality of metal-to-metal hybrid bonds formed between metal contacts placed upon contacting surfaces of each of the logic die and the memory die. The method then calls for applying, using an accelerator core coupled to the AI processor element, the plurality of neural network weights to input data for one or more nodes of a plurality of nodes of a neural network to obtain an intermediate output. Further, according to the method, activation data is retrieved from an activation memory directly connected with the AI processor element on the logic die. The activation data retrieved can be applied to the intermediate output to obtain a result for a neural network layer in furtherance of the method. A result can be stored in at least one of: the 3D memory cell, an FPGA buffer, and the activation memory, thereby facilitating computations at additional neural network layers until a final result is reached.

In some implementations of the method, the AI processor element is directly connected to an activation memory by a second plurality of metal-to-metal hybrid bonds formed between metal contacts placed upon contacting surfaces of each of the logic die and the memory die.

In an example implementation of the method, retrieving activation data from the activation memory, further includes retrieving data representing a non-linear function identifying relationships between inputs and outputs of the neural network.

In another example implementation of the method, retrieving activation data from the activation memory, further includes retrieving data implementing an activation function selected from at least one of a sigmoid function, a hyperbolic tangent (tanh) function, a rectified linear unit (ReLU) function, a leaky rectified linear unit (LReLU) function, and a maxout function.

In a further example implementation, the method further includes storing to the activation memory, data representing a non-linear function identifying relationships between inputs and outputs of the neural network.

In a yet further example implementation of the method, storing to the activation memory activation data, further includes storing data implementing an activation function selected from at least one of a sigmoid function, a hyperbolic tangent (tanh) function, a rectified linear unit (ReLU) function, a leaky rectified linear unit (LReLU) function, and a maxout function.

In a still further example implementation, the method further includes receiving by the AI processing element, weight data; and storing the weight data as received to the weight memory directly connected to the AI processing element.

In a still yet further example implementation, the method further includes receiving by at least two AI processing elements of the plurality of AI processing elements, weight data and storing by each of the at least two AI processing elements, weight data as received to corresponding 3D memory cells of the at least two of the plurality of 3D memory cells directly connected to the at least two AI processing elements.

In a still yet further example implementation, the method further includes repeatedly performing retrieving-storing actions for additional neural network layers, until a final result is reached.

Specific implementations provide a 3D NAND high bandwidth memory with an accelerator suited for AI inference applications. High-capacity storage for neural network weight data can be provided by 3D NAND implementations. In some implementations, high read bandwidth between the 3D NAND and the AI accelerator can boost performance of inferencing applications. In some implementations, lower power consumption can be achieved by disposing computing processing power near storage memory.

Other aspects and advantages of the present invention can be seen on review of the drawings, the detailed description and the claims, which follow.

BRIEF DESCRIPTION OF THE DRAWINGS

FIG. 5 is a flowchart of a runtime procedure which can be executed by an inference system as described herein.

DETAILED DESCRIPTION

A detailed description of embodiments of the present invention is provided with reference to the FIGS. 1-8.

Figure 1:
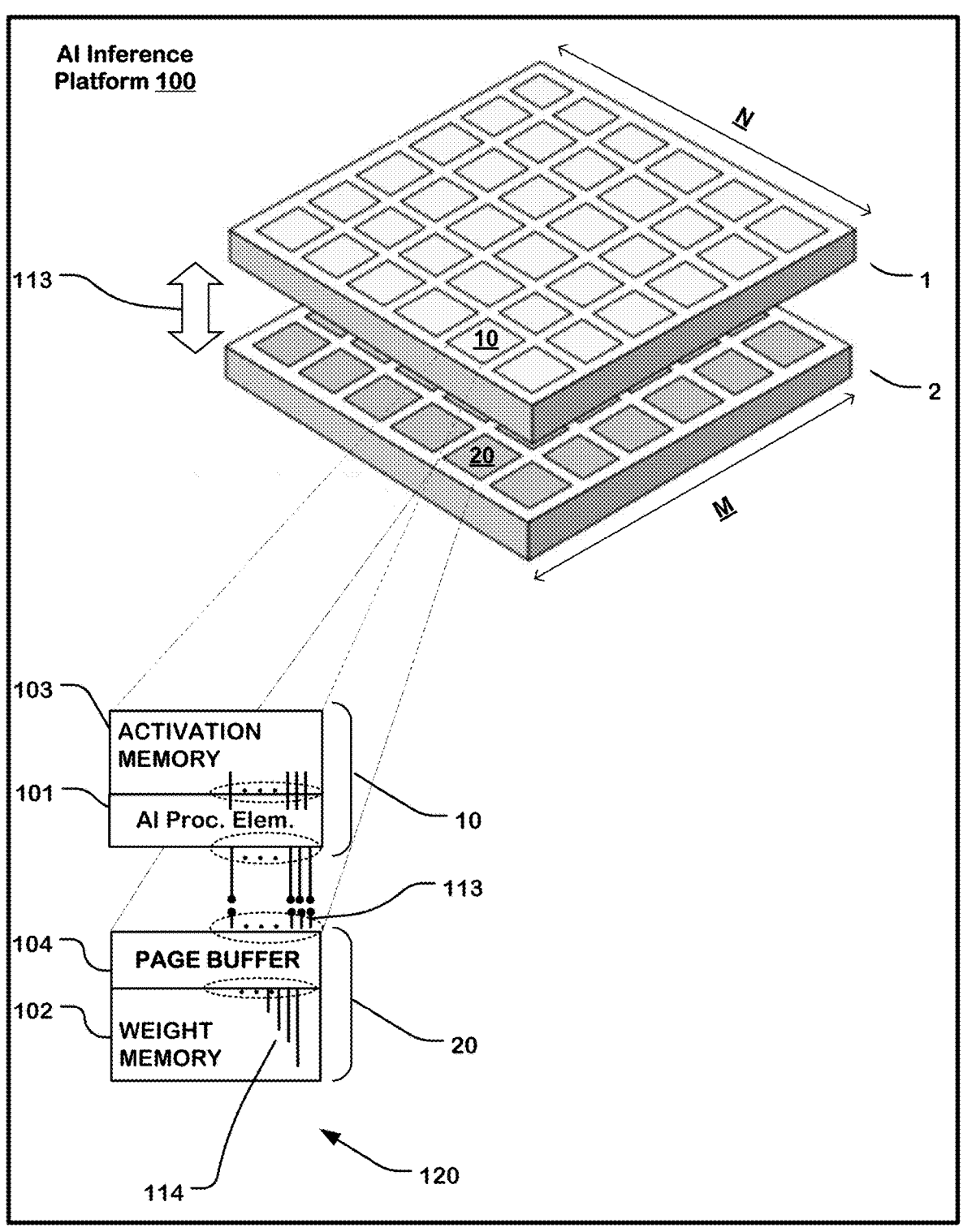
FIG. 1 is an illustration of a high read endurance memory cell processor-in-memory multichip module including an artificial intelligence (AI) inference platform as described herein.

FIG. 1 illustrates an artificial intelligence (AI) inference platform 100 having a high read endurance cell array configuration to support storage and retrieval of information at higher bandwidths useful in Artificial Intelligence (AI) inferencing applications. Specifically, artificial intelligence (AI) inference platform 100 includes a logic die 1 (e.g., a logic die including an N×M array of AI accelerator processing elements that perform computations in AI inferencing applications), and a memory die 2 (e.g., a memory die including an N×M array of memory cells for storage and retrieval of neural network weights for use in neural network computations). Memory cells can be implemented using 3D NAND, 3D NOR or other suitable memory technologies and can be considered high bandwidth memory. Each AI accelerator processing element 10 of the logic die 1 is coupled, by a plurality of direct vertical connections 113, to a corresponding memory cell 20 of the memory die 2. Such coupling can be implemented using Copper to Copper (Cu-to-Cu) hybrid bond vias or the equivalent to provide a processing in memory (PIM) architecture that can provide high bandwidth storage and retrieval of weights and other information supporting AI inferencing applications.

While depicted as a single entity in FIG. 1 for clarity, weight memory 102 can comprise multi-layered stack, in which memory dies are disposed on different layers (or "planes") and can be directly connected to vertical connectors such as Copper to Copper (Cu-to-Cu) hybrid bond vias to page buffer 104.

Representative AI accelerator processing element 10 (of FIG. 1) can include an AI processor element 101 coupled to an activation memory 103, which can be preferably a dynamic random access memory (DRAM) or a static random access memory (SRAM), or alternatively a NAND, serving as a logic buffer that stores activation data for implementing activation function(s) used in neural network computations. The AI processor element 101 can include one or more chips implementing a runtime processor core (e.g., CPU) and an accelerator core, such as an artificial intelligence accelerator (e.g. AIAcc) or a neuron processing unit (e.g., NPU).

Representative memory cell 20 (of FIG. 1) can include a weight memory 102 having a 3D NAND, 3D NOR or other configuration, coupled to a page buffer 104 facilitating storage and retrieval of weights and other information supporting AI inferencing applications. Additional memory planes may be added to the weight memory 102 to achieve greater read bandwidth and faster sustained read speed for ANN (Artificial Neuron network) weights access operations. The memory planes are connected to the page buffer 104 using Copper to Copper (Cu-to-Cu) hybrid bond vias 114 for example.

With continuing reference to FIG. 1, high bandwidth can be achieved because the weights can be moved directly from the page buffer 104 to the AI processor element 101 (or multiple AI processor elements). In implementations, the number of reads/writes is reduced because an additional buffer is not needed between the page buffer 104 of the memory and the AI processor element 101.

Figure 2:
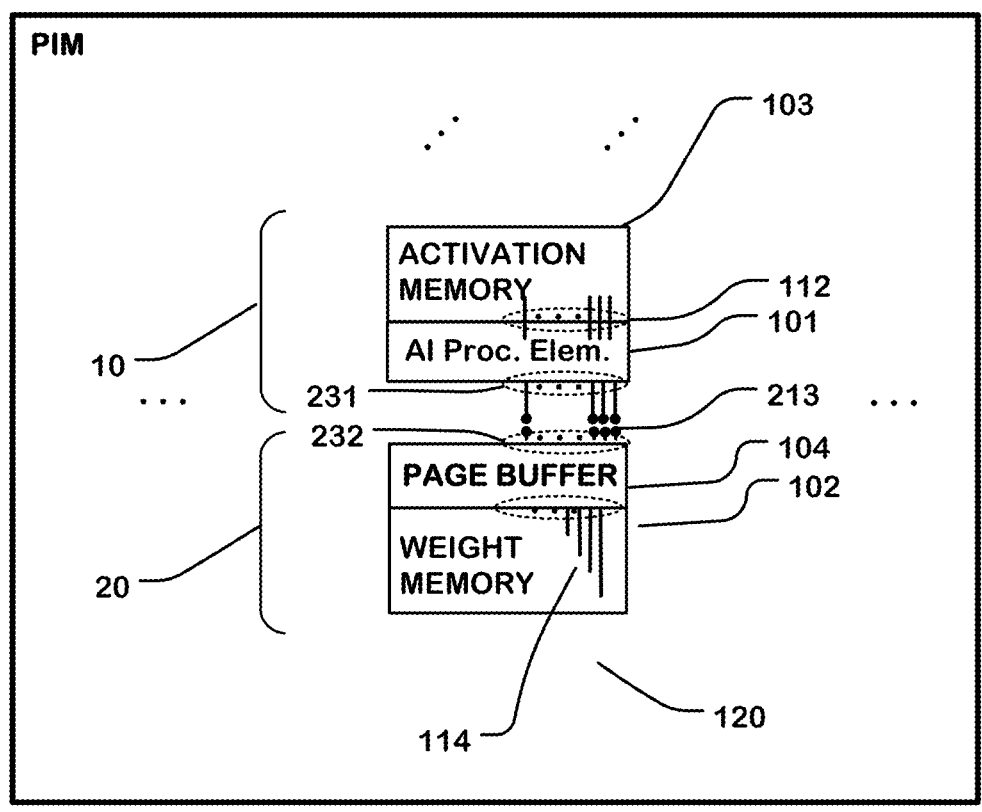
FIG. 2 is an illustration of an inference platform as described herein.

Now with reference to FIG. 2, an AI inference platform unit 120 as described herein is depicted.

A plurality of Copper to Copper hybrid bond vias 213 directly connect AI processor element 101 in the logic die 1 and page buffer 104 of corresponding memory cell 20 in the memory die 2; thereby enabling storage and retrieval of neural network weights from the page buffers of memory cell 20 for use in neural network computations conducted by a corresponding AI accelerator processing element 10 in the logic die 1.

One such AI processor element 101 illustrated by FIG. 2, includes a chip-to-chip bonding surface on which an interface 231 is exposed for connection to the page buffer 104. The page buffer 104 includes an interface 232 exposed on a surface of the memory cell 20, and complementary to the interface 231 on the AI processor element 101. In this example, direct vertical connections at the surfaces are provided between the memory interface 232 and the interface 231. The direct vertical connections can comprise copper to copper hybrid bonding, very short length copper via-to-via conductors or other chip-to-chip contact technologies suitable for high speed, low latency, and low power communication between the chips. Various 3D packaging technologies can implement connections 113 between logic die 1 and memory die 2 including one or more of a 3D System-In-Package (SIP) implementation, a 3D Stacked-Integrated Circuits (SIC) implementation, a 3D System-On-Chip (SOC) configuration, and a 3D Integrated Circuit (IC) configuration. With continuing reference to FIG. 2, AI processor element 101 further includes a second interface site for establishing direct connection between the AI processor element 101 and activation memory 103. A Metal to metal bonding such as using Copper to Copper (Cu-to-Cu) hybrid bond vias for example can be used to establish vertical connections 112 connecting AI processor element 101 and activation memory 103.

Figure 3:
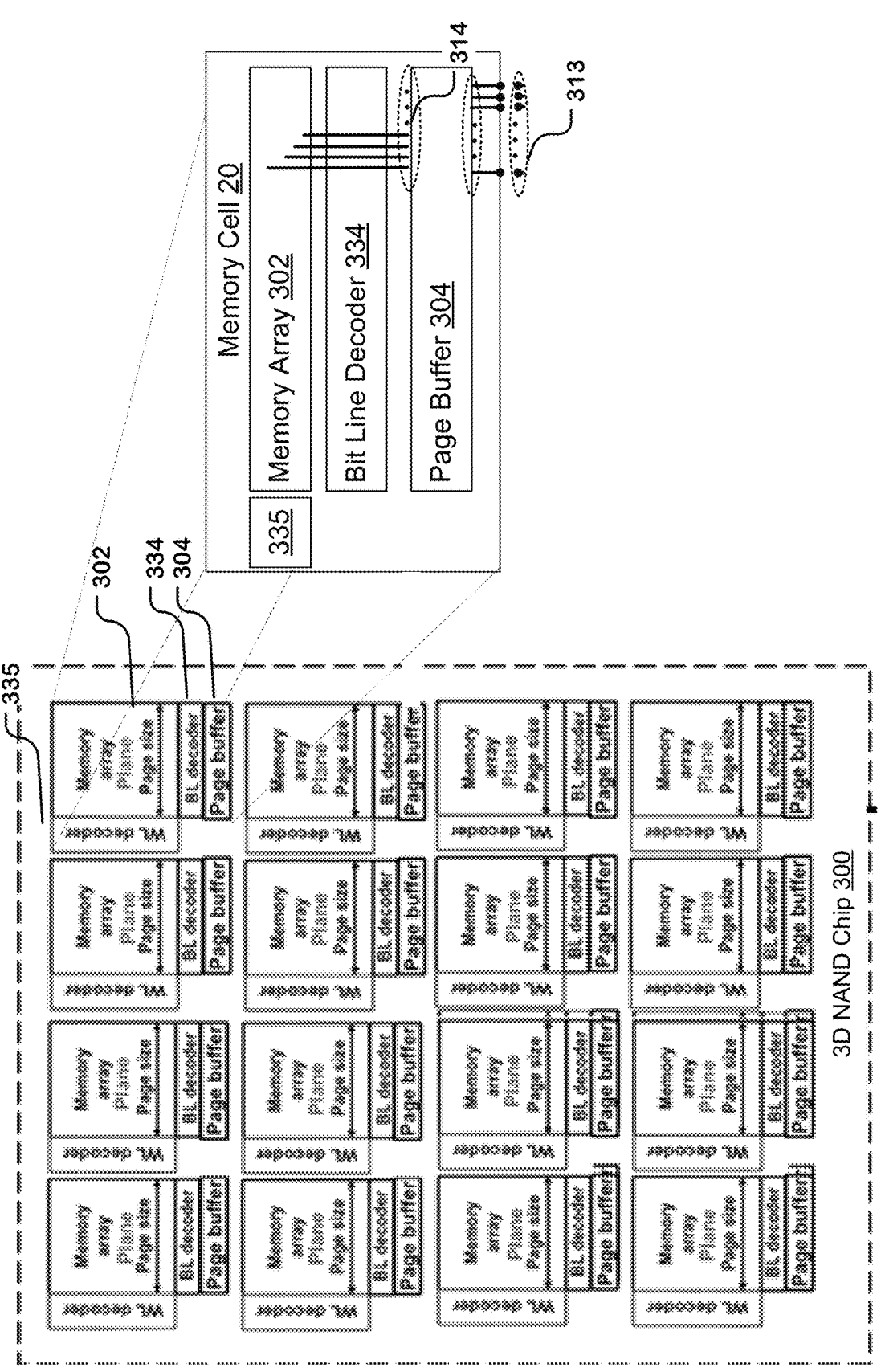
FIG. 3 is an illustration of a high read endurance cell array suitable for implementing an inference platform as described herein.

FIG. 3 is an illustration of a high read endurance cell array suitable for implementing an inference platform as described herein. As illustrated in FIG. 3, 3D NAND chip 300 includes a representative memory array 302 that can be one 3D NAND memory array of the N×M array of the memory die 2 (of FIG. 1). Memory array 302 includes a memory I/O interface for off-chip communications via a page buffer 304 that provides an interface via a plurality of direct vertical connections 313 to a corresponding processor chip (not shown in FIG. 3 for clarity sake). Direct vertical connections 313 can implement Copper to Copper (Cu-to-Cu) hybrid bond vias forming sets of high-speed data pathways on which weight data can flow across an interface exposed on a surface of a 3D NAND layer of the N×M array of memory die 2, and complementary interface on a surface of the logic die 1 (not shown in FIG. 3 for clarity). Weigh data is stored in and retrieved from memory array 302 (e.g., multi-layer 3D NAND or the like) via the page buffer 304. A bit line (BL) decoder 334 and word line (WL) decoder 335 provide control and addressability. The 3D NAND memory can be arranged in planes directly connected by vertical connections 314 to the page buffer 304. While described herein with reference to an example implementing Copper to Copper (Cu-to-Cu) hybrid bond vias, the direct vertical connections 313, 314 can comprise very short length copper via-to-via conductors or other chip-to-chip contact technologies suitable for high speed, low latency, and low power communication between the chips. In an implementation, buffer 304 is a 16 KB buffer that is connected to a corresponding processing element in logic die 1 by 128K Copper-to-Copper vias implementing vertical connections 313. While illustrated herein as a 3D NAND flash memory, memory array 302 can be implemented with one of a phase change memory (PCM), or a three-dimensional cross point memory (3D Xpoint). In other examples, the memory array 302 can comprise NOR flash memory using charge trapping storage technology, or other suitable random-access technologies like resistive RAM (e.g. metal oxide memory), magnetic RAM, Ferroelectric RAM a conductive bridge random-access memory CBRAM and so on.

Figure 4:
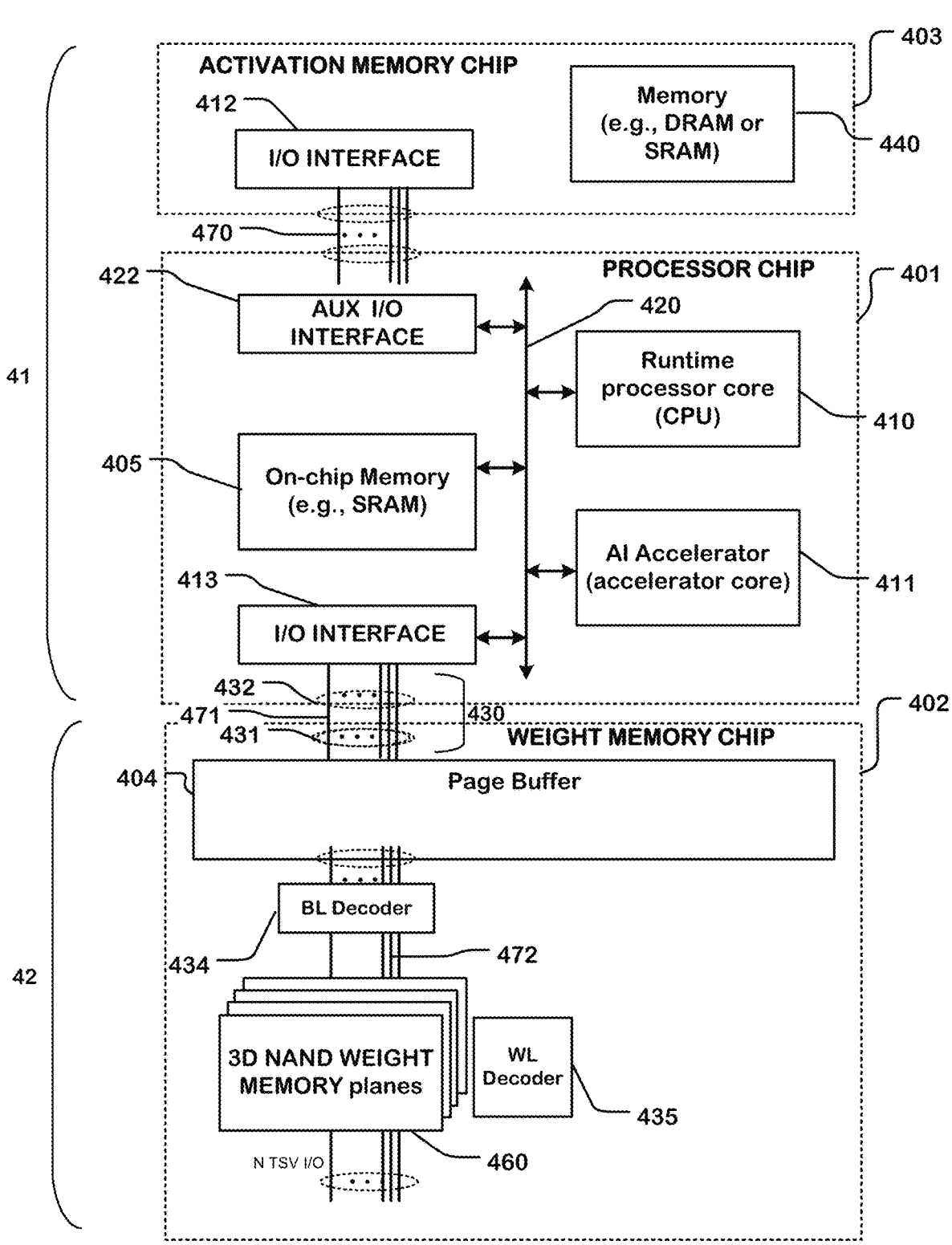
FIG. 4 is a simplified functional block diagram of an inference platform as described herein.

FIG. 4 is a simplified functional block diagram of an inference system implemented as described with reference to FIGS. 1-3. The platform includes a processor chip 401 (e.g., implementing computations, control, and other inferencing operations), an activation memory chip 403 (e.g., storing activation data for implementing an activation function), and a weight memory chip 402 (e.g., storing weight data for a neural network ensemble). The processor chip 401 in this example includes a runtime processor (e.g., CPU) 410, an AI accelerator (e.g., accelerator core 411), an on-chip memory 405, such as SRAM (or other type of memory) which can be used as working memory and as a cache memory, a first I/O interface 413 and a second I/O interface 422. A bus system 420 provides for intra-chip communications among the components of the processor chip 401.

The activation memory chip 403 in this example comprises a memory 440 such as DRAM or SRAM (however some configurations can implement a 3D NAND or other type of memory implemented using charge trapping storage technology), for example. The activation memory chip 403 includes a first memory I/O interface 412 for storage and retrieval of activation (and other) data with processor chip 401. The first memory I/O interface 412 can include direct vertical connections 470 at the surfaces between the activation memory chip 403 and processor chip 401. The direct vertical connections 470 can comprise Copper to Copper (Cu-to-Cu) hybrid bond vias, or alternatively, very short length copper via-to-via conductors or other chip-to-chip contact technologies suitable for high speed, low latency, and low power communication between the chips.

Alternatively, a high-speed serial port, such as a serial peripheral interface (SPI) compatible port, or a parallel port, depending on the particular implementation of the activation memory chip 403, can be utilized.

The weight memory chip 402, in this example, preferably comprises a 3D NAND high bandwidth (HB), nonvolatile memory (NVM) configured in one or more 3D NAND weight memory array planes 460 (e.g., layers of NVM dies). While illustrated herein as a 3D NAND flash memory, weight memory chip 402 can be implemented with one of a phase change memory (PCM), or a three-dimensional cross point memory (3D Xpoint). In other examples, the weight memory chip 402 can comprise NOR flash memory using charge trapping storage technology, or other suitable random-access technologies like resistive RAM (e.g. metal oxide memory), magnetic RAM, Ferroelectric RAM a conductive bridge random-access memory CBRAM and so on.

The weight memory chip 402 includes a memory I/O interface 430 for off-chip communications via a page buffer 404 to the I/O interface 413 on the processor chip 401. Direct vertical connections 471 can implement Copper to Copper (Cu-to-Cu) hybrid bond vias forming one or more sets of high-speed data pathways on which weight data can flow across an interface 432 exposed on a surface of the logic die 41, and complementary interface 431 on a surface of the memory die 42. Data is stored in and retrieved from weight memory chip 402 via page buffer 404. A bit line (BL) decoder 434 and word line (WL) decoder 435 provide control and addressability. Memory arranged in the 3D NAND weight memory array planes 460 can be directly connected by vertical connections 472. While described herein with reference to an example implementing Copper to Copper (Cu-to-Cu) hybrid bond vias, the direct vertical connections 470, 471, 472 can comprise very short length copper via-to-via conductors or other chip-to-chip contact technologies suitable for high speed, low latency, and low power communication between the chips. An external controller can be provided in a field programmable gate array (FPGA) or system on a chip (SoC) die (e.g., implementing processor chip 401).

An AI accelerator (e.g. accelerator core 411), as the term is used herein, is a configurable logic circuit including components designed or suitable for execution of some or all of the arithmetic operations of AI inference operations. Configuration of the accelerator core can include loading a set of weights from the weight memory chip 402 to be used in conducting inference operations, or parts of the set of weights. In some embodiments, configuration of the accelerator core 411 can conduct loading some or all of the of the computation graphs of an inference model that define the sequence and architecture of the operation of the inference model. The inference model can comprise a computation graph of a deep learning neural network, in some examples having a plurality of fully connected and partially connected layers, activation functions, normalization functions and so on.

An accelerator core can be implemented using configurable logic, like arrays of configurable units used in field programmable gate arrays for example, in which compiled computation graphs are configured using bit files. An accelerator core can be implemented using a hybrid of data flow configurable logic and sequential processing configurable logic.

The runtime processor core 410 can execute a runtime program to coordinate operation of the accelerator core to accomplish real time inference operations, including data input/output operations, loading computation graphs, moving the set of weights to be applied in the inference operation into and out of the accelerator core, delivering input data to the accelerator core, and performing parts of the computations to obtain inference results.

Figure 6:
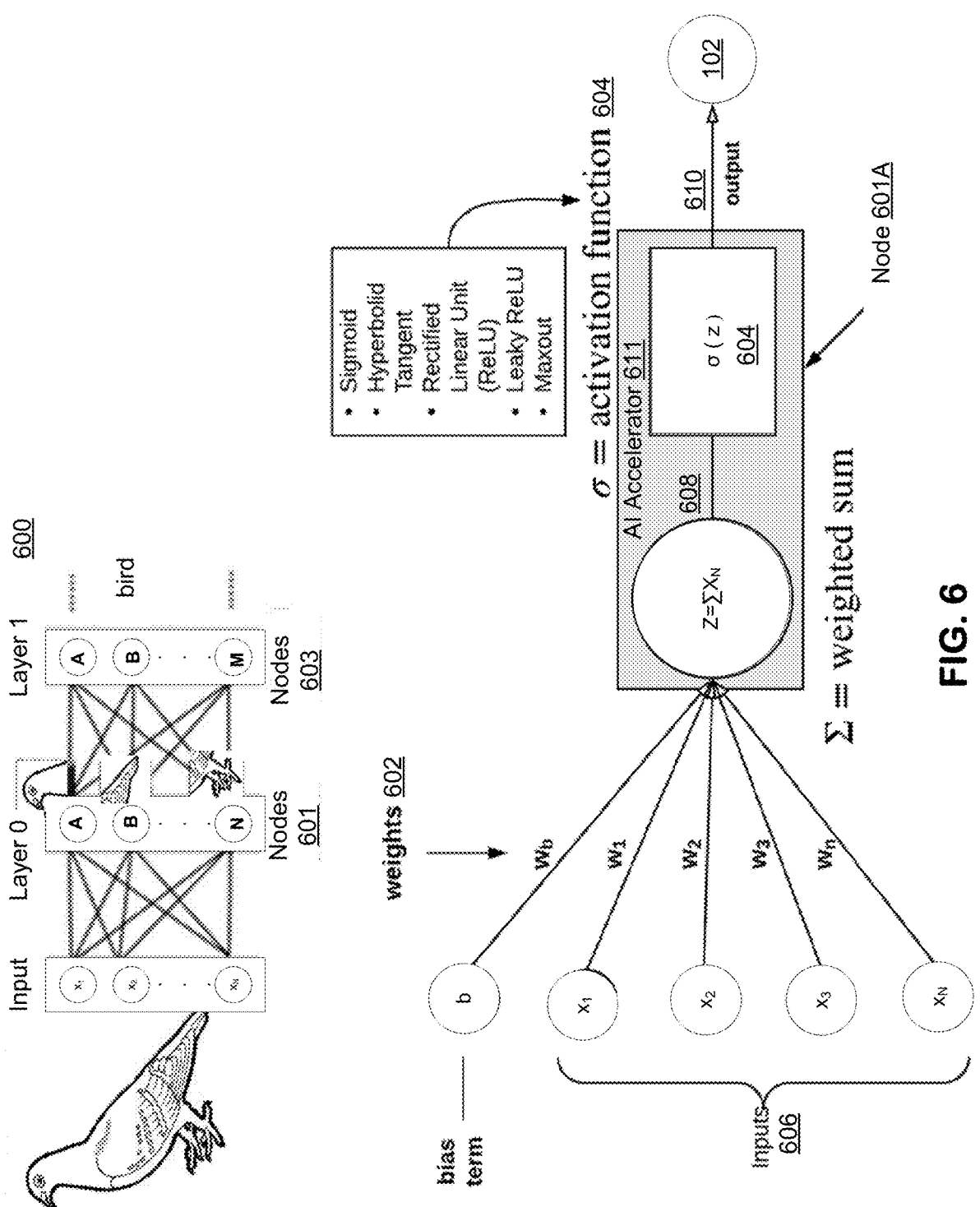
FIG. 6 is a simplified functional block diagram of a representative neural network node (neuron) of a multi-layer neural network processed by the AI inference system as described herein.

FIG. 5 is a flowchart of a runtime procedure which can be executed by an inference system as described herein. FIG. 5 is a flowchart 500 illustrating an example of logic of operations executed by one or more neural processor (3D NAND) pairings in an inference system, such as described with reference to FIGS. 1-4. FIG. 6 is a simplified functional block diagram of a representative neural network node (neuron) processed by the AI inference system logic as described herein. The logic can be implemented using machine executable instructions stored in memory, such as the SRAM on-chip memory 405, or other memory accessible by the representative runtime processor core 410 of processor chip 401. The processor chip 401 is directly connected by a plurality of copper-to-copper hybrid-bond vias 471 to a page buffer 404 (nominally having a buffer size of 16 KB) of a weight memory chip 402 thereby enabling AI accelerator (e.g., accelerator core 411) to transfer weight data retrieved from 3D NAND weight memory array planes 460 to the runtime processor core 410. The 3D NAND weight memory array planes 460 can include one or more layers or planes stacked vertically one above another, forming a layered vertical stack of planes, each of the planes including at least one memory chip and a plurality of direct vertical connections to a corresponding processor chip 401 in the logic die 41. In this example, a collection of weights for artificial intelligence neural network computations downloaded from an external source, such as a network, is loaded into the 3D NAND of the inference system.

FIG. 6 is a simplified functional block diagram of a representative neural network node (neuron) of a multi-layer neural network processed by the AI inference system as described herein. As shown in FIG. 6, multi-layer neural network 600 is comprised of a plurality of layers, such as layer 0 and layer 1. The different layers of the neural network include different nodes, e.g., layer 0 comprises of nodes 601 and layer 1 comprises of nodes 603. Further each of the nodes 601, 603 will employ different groups of weights 602. Further, weights 601, 603 can be of a different type, and function for the different layers. For example, weights associated with layer 0 e.g., nodes 601 can include weights used by the nodes 601A-601N to break down an input image in a convolutional network (CNN). Layer 1 nodes 603 can include weights useful to receive the output of the layer 0 nodes 601 and perform further inferencing processes to arrive at a final output ("bird") to classify the input image. Of course, other types of neural network architectures (e.g., purpose, layers, etc.) can also be implemented according to some other paradigm defined by the neural network definition. In some implementations, the weights corresponding to a first layer of a neural network 600 can be stored according to one paradigm (e.g., a first set of cells in memory die 2 of FIG. 1) and weights corresponding to a second layer of the neural network can be stored according to a different paradigm. Having reviewed the architecture of a representative multi-layer neural network 600, next we will describe operations carried out by a representative node 601A of multi-layer neural network 600.

Figure 7:
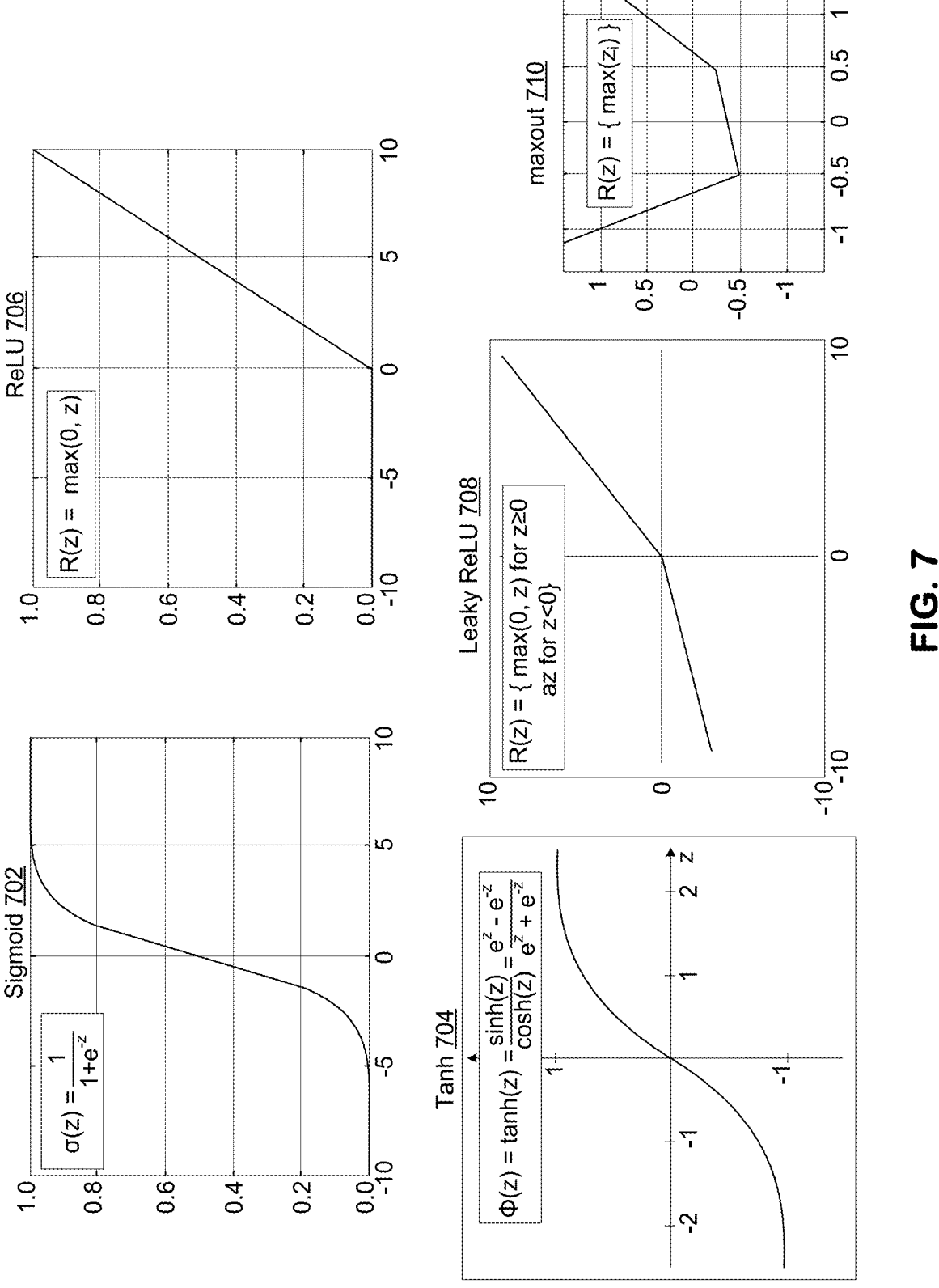
FIG. 7 illustrates representative activation functions suitable for implementing artificial intelligence inferencing as described herein.

With reference to FIGS. 5, 6, and 7, during runtime, an operation retrieves a plurality of neural network weights 602

(e.g., $W_b$, $W_1$, $W_2$, $W_3$, and $W_n$) stored in the weight memory (operation 501). The weight data is directly transferred into the AI accelerator 611 to perform calculations. Activation data implementing an activation function 604 is retrieved from an activation memory (e.g., 403 of FIG. 4) (operation 502). With reference to FIG. 7, suitable activation data can include stored data implementing an activation function 604 including one or more of a sigmoid function 702, a hyperbolic tangent (tanh) function 704, a rectified linear unit (ReLU) function 706, a leaky rectified linear unit (LReLU) function 708, and a maxout function 710.

After loading the weights and configuring the AI accelerator 611, the operations include executing by one or more processors (e.g., runtime processor 410 of FIG. 4) an inference procedure using the AI accelerator 611 to apply the plurality of neural network weights 602 to input data 606 for each one of a plurality of nodes 601 of a neural network 600 to obtain an intermediate output 608 (operation 503) for one or more layers of nodes of the neural network. The intermediate output 608 comprises a set of computational results from nodes of the layer of the neural network.

Next, the activation function 604 stored in, for example the activation memory 103 (e.g., activation memory chip 403 of FIG. 4) is applied to the intermediate output 608 to obtain an output 610 (e.g., a result) for one or more layers of the neural network (operation 504). For example, in operation 504, the AI accelerator (e.g., accelerator core 411) can apply the activation function 604 to results 608 of nodes of a layer of a neural network. The result 610 is stored in the weight memory chip 402, or an FPGA buffer or any storage device, or activation memory chip 403 (operation 505). The procedure includes checking if nodes at further neural network layers are to be processed (operation 506) and if so, restarting operations 501-505 for the next batch of neural network nodes to be processed. If there are no further layers to process then the output is provided directly and/or stored (e.g., for storage back in weight memory 102, FPGA buffer or any storage device.).

Thus, the operations of FIG. 5 include an operation to select activation data and weights stored in the one or more memory chips, into the accelerator core, and to execute the neural network nodes using the weights and activation data. Also, as shown in FIG. 5, after executing or beginning to execute the selected neural network nodes, the operations loop to operation 501, to process a next layer of the neural network. If more neural network nodes are to be processed, the operations 501 to 506 are traversed, and can include changing the activation data to a different function, loading the weights for the nodes of the next neural network layer, and executing the different nodes.

It will be appreciated with reference to FIG. 5, that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

During training processing, weights stored in the layers of the 3D NAND (e.g., of the weight memory chip 402) are adjusted by the processor chip 401 (e.g., CPU) and an AI accelerator core 411) based upon training dataset(s). As training progresses, the processor chip 401 will keep updating values for the weights and this value will be stored in the weight memory chip 402. In some implementations, weights are fixed during inference processing.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 8:
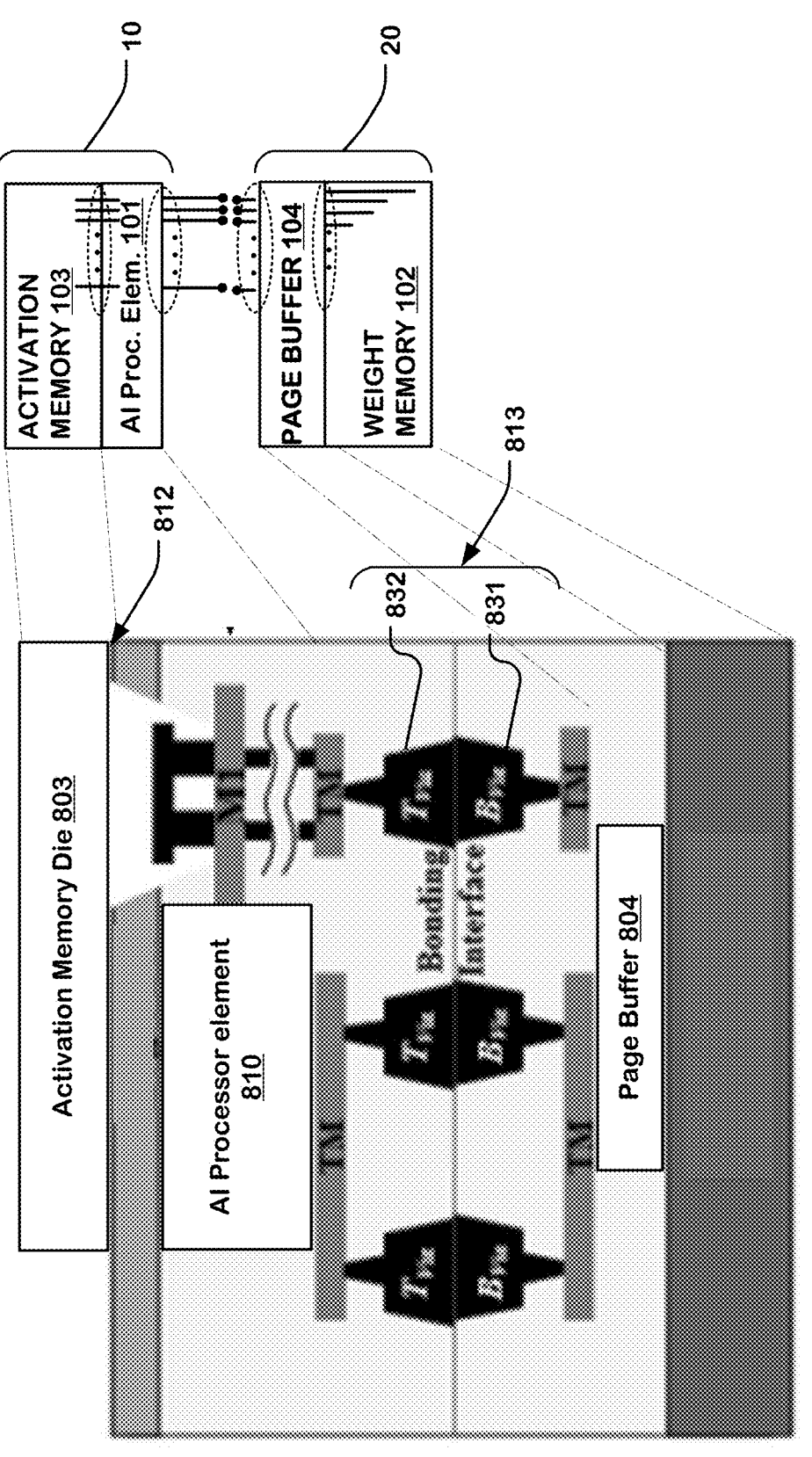
FIG. 8 depicts a representative hybrid bond suitable for implementing direct vertical connections between dies in an inference system as described herein.

FIG. 8 depicts a representative hybrid bond suitable for implementing direct vertical connections between dies in an inference system as described herein. As depicted by FIG. 8, a direct vertical connection 813 is implemented between a top surface of a page buffer 804 and a bottom surface of an AI processor element 810. A Metal-to-Metal bond can be formed by using metal tabs formed on the surfaces of dies. For example, a top metal (TM) 831 of a page buffer 804 of a memory die 20 can be connected with a bottom metal (BM) 832 of an AI processor element 810 of a logic die 10 forming Copper to Copper (Cu-to-Cu) vias. While described herein with reference to an example implementing Copper to Copper (Cu-to-Cu) hybrid bond vias, direct vertical connections 813 can comprise very short length copper via-to-via conductors or other chip-to-chip contact technologies suitable for high speed, low latency, and low power communication between the chips. With continuing reference to FIG. 8, logic die 10 further includes a second interface site for establishing direct connection 812 between the AI processor element 810 and activation memory die 803. A Metal to metal bonding technique, such as using Copper to Copper (Cu-to-Cu) hybrid bond vias for example, can be used to establish vertical connections 812 connecting AI processor element 810 and activation memory die 803.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

As used herein, a network node, including network nodes referred to as client side nodes and a server side nodes, is an application hosted on an active electronic device, or virtual device executed in an active electronic device such as a cloud-based platform, that is attached to a network, and is capable of sending, receiving, or forwarding information in support of computer programs such as servers and clients, over a physical media for a communications channel on the network, and having for example media access control addresses and protocol stacks that support higher network layers. A network can include the networks using Internet Protocol addresses, or other type of network layer addresses. In some embodiments the network comprises the Internet. Examples of electronic devices which can host network nodes, include all varieties of computers, workstations, laptop and desktop computers, hand-held computers and smart phones, and cloud-based platforms.

A byte is a basic storage unit used in many integrated circuit logic and memory circuits, and consists of eight bits.

Basic storage unit can have other sizes, including for example one bit, two bits, four bits, 16 bits and so on. Thus, the description of a high bandwidth 3D NAND-CPU coupled architecture set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four-bit storage units combined with eight-bit storage units.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An artificial intelligence (AI) inference platform, comprising:
 a logic die including an array of AI accelerator processing elements, each AI accelerator processing element including an activation memory and an AI processor element;
 a memory die including an array of cells implementing a weight memory and a page buffer; and
 a plurality of vertical connections that directly connect AI accelerator processing elements in the logic die and the page buffer of corresponding cells in the array of the memory die.

2. The AI inference platform of claim 1, wherein the AI accelerator processing elements implement neural processing units (NPU).

3. The AI inference platform of claim 1, wherein the direct vertical connections comprise copper-to-copper hybrid bond vias.

4. The AI inference platform of claim 1, wherein an AI processor element performs at least one of a storage and a retrieval of a neural network weight to or from a particular page buffer of a corresponding memory cell of the array for use in neural network computations conducted by a corresponding AI accelerator processing element in the logic die.

5. The AI inference platform of claim 1, wherein the memory die further comprises 3D NAND.

6. The AI inference platform of claim 1, wherein the activation memory comprises a static random-access memory (SRAM).

7. The AI inference platform of claim 6, wherein the activation memory stores activation data including a non-linear function identifying relationships between inputs and outputs of a neural network.

8. The AI inference platform of claim 7, wherein the activation memory stores activation data including data implementing an activation function selected from at least one of a sigmoid function, a hyperbolic tangent (tanh) function, a rectified linear unit (ReLU) function, a leaky rectified linear unit (LReLU) function, and a maxout function.

9. The AI inference platform of claim 1, wherein the memory die implements one of a phase change memory (PCM), a NOR flash memory, a 3D AND flash memory, a resistive random-access memory (RRAM), a magneto-resistive random-access memory (MRAM), a ferroelectric random-access memory (FeRAM), a conductive bridge random-access memory (CBRAM), and a 3D NAND flash memory.

10. The AI inference platform of claim 1, wherein the page buffer of a corresponding cell in the array of the memory die is incorporated into the memory die, such that no external buffer is located between the memory die and the logic die.

11. An artificial intelligence (AI) inference method for applying weight data from a high-bandwidth memory to neural network computations, the method comprising:
 retrieving, by an AI processor element of a plurality of AI processor elements arrayed on a logic die, a plurality of neural network weights stored in a corresponding 3D memory cell of a plurality of 3D memory cells arrayed on a memory die; wherein the AI processor element is directly connected to the corresponding 3D memory cell by a plurality of metal-to-metal hybrid bonds formed between metal contacts placed upon contacting surfaces of each of the logic die and the memory die;
 applying, using an accelerator core coupled to the AI processor element, the plurality of neural network weights to input data for one or more nodes of a plurality of nodes of a neural network to obtain an intermediate output;
 retrieving activation data from an activation memory directly connected with the AI processor element on the logic die;
 applying the retrieved activation data to the intermediate output to obtain a result for a neural network layer; and
 storing the result in at least one of the corresponding 3D memory cell, a field programmable gate array (FPGA) buffer, and the activation memory, thereby facilitating computations at additional neural network layers until a final result is reached.

12. The artificial intelligence (AI) inference method of claim 11, wherein the AI processor element is directly connected to the activation memory by a second plurality of metal-to-metal hybrid bonds formed between metal contacts placed upon contacting surfaces of each of the logic die and the memory die.

13. The artificial intelligence (AI) inference method of claim 11, wherein the retrieving of the activation data from the activation memory, further includes retrieving data representing a non-linear function identifying relationships between inputs and outputs of the neural network.

14. The artificial intelligence (AI) inference method of claim 13, wherein the retrieving of the activation data from the activation memory, further includes retrieving data implementing an activation function selected from at least one of a sigmoid function, a hyperbolic tangent (tanh) function, a rectified linear unit (ReLU) function, a leaky rectified linear unit (LReLU) function, and a maxout function.

15. The artificial intelligence (AI) inference method of claim 11, further including storing, to the activation memory, data representing a non-linear function identifying relationships between inputs and outputs of the neural network.

16. The artificial intelligence (AI) inference method of claim 15, wherein the storing of the data further includes storing data implementing an activation function selected from at least one of a sigmoid function, a hyperbolic tangent (tanh) function, a rectified linear unit (ReLU) function, a leaky rectified linear unit (LReLU) function, and a maxout function.

17. The artificial intelligence (AI) inference method of claim 11, further including:
  receiving, by the AI processing element, weight data; and

14 storing the weight data as received to a memory cell of the weight memory directly connected to the AI processing element.

18. The artificial intelligence (AI) inference method of claim 11, further including:
  receiving, by at least two AI processing elements of the plurality of AI processing elements, weight data; and
  storing, by each of the at least two AI processing elements, the weight data as received to corresponding 3D memory cells of the at least two of the plurality of 3D memory cells directly connected to the at least two AI processing elements.

19. The artificial intelligence (AI) inference method of claim 11, further including:
  repeatedly performing the retrieving of the neural network weights, the applying of the neural network weights, the retrieving of the activation data, the applying of the activation data and the storing of the result for additional neural network layers, until a final result is reached.

* * * * *